United States Patent
Nakamura

(10) Patent No.: US 8,625,892 B2
(45) Date of Patent: Jan. 7, 2014

(54) IMAGE PROCESSING APPARATUS AND PIXEL INTERPOLATION METHOD

(75) Inventor: Satoshi Nakamura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 171 days.

(21) Appl. No.: 13/351,719

(22) Filed: Jan. 17, 2012

(65) Prior Publication Data

US 2012/0189200 A1 Jul. 26, 2012

(30) Foreign Application Priority Data

Jan. 26, 2011 (JP) .................................. 2011-013839

(51) Int. Cl.
*G06K 9/00* (2006.01)

(52) U.S. Cl.
USPC .......................................... 382/167; 382/162

(58) Field of Classification Search
USPC .................. 382/162–167, 181, 190, 209, 300
See application file for complete search history.

(56) References Cited

U.S. PATENT DOCUMENTS

| | | | |
|---|---|---|---|
| 5,327,257 A | | 7/1994 | Hrytzak et al. |
| 2002/0015162 A1* | | 2/2002 | Hoshii et al. .................... 358/1.2 |
| 2005/0007611 A1* | | 1/2005 | Matsukubo et al. ............ 358/1.9 |
| 2009/0079855 A1* | | 3/2009 | Ito et al. ......................... 348/265 |
| 2010/0290092 A1 | | 11/2010 | Tabata |
| 2011/0311155 A1* | | 12/2011 | Miyake et al. ................. 382/263 |

FOREIGN PATENT DOCUMENTS

| | | |
|---|---|---|
| EP | 0 713 326 A1 | 5/1996 |
| EP | 1 686 529 A1 | 8/2006 |
| EP | 1 720 337 A1 | 11/2006 |
| EP | 2 161 914 A1 | 3/2010 |
| JP | 2007142667 A * | 6/2007 |
| JP | 2008-135988 | 6/2008 |
| JP | 4330164 | 6/2009 |

OTHER PUBLICATIONS

Gunturk et al. "Demosaicking: color filter array interpolation", IEEE Signal Processing Magazine, 2005.*
English translation of JP 2007-142667.*
U.S. Appl. No. 13/352,993, filed Jan. 18, 2012, Nakamura.
Extended European Search Report issued May 7, 2012 in patent application No. 12152355.9.

* cited by examiner

*Primary Examiner* — Li Liu
(74) *Attorney, Agent, or Firm* — Oblon, Spivak, McClelland, Maier & Neustadt, L.L.P.

(57) ABSTRACT

A color separating unit separates a color image into plural color components to generate images of respective colors. A periodicity determining unit determines, for each of the color images, whether an image region including a target pixel whose pixel value is to be interpolated is a periodic region in which pixel values vary periodically. A first generating unit generates pixel values of the respective colors of a pixel using a first interpolation method. A second generating unit generates pixel values of the respective colors of a pixel using a second interpolation method. A control unit determines which one of the first and second generating units is to be used for generating pixel values of the respective colors of the target pixel. A pixel value combining unit combines candidate pixel values which are the pixel values of the respective colors of the target pixel to calculate a combined pixel value.

13 Claims, 16 Drawing Sheets

FIG.5A
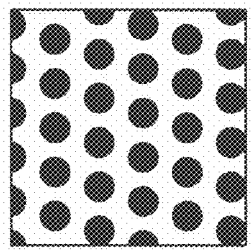
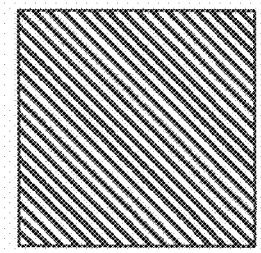
FIG.5B
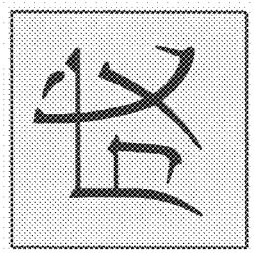
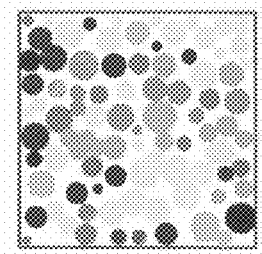
FIG.5C
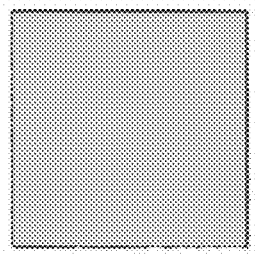
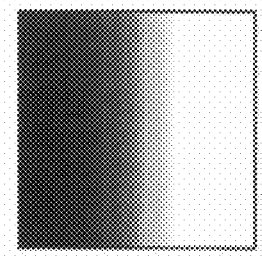

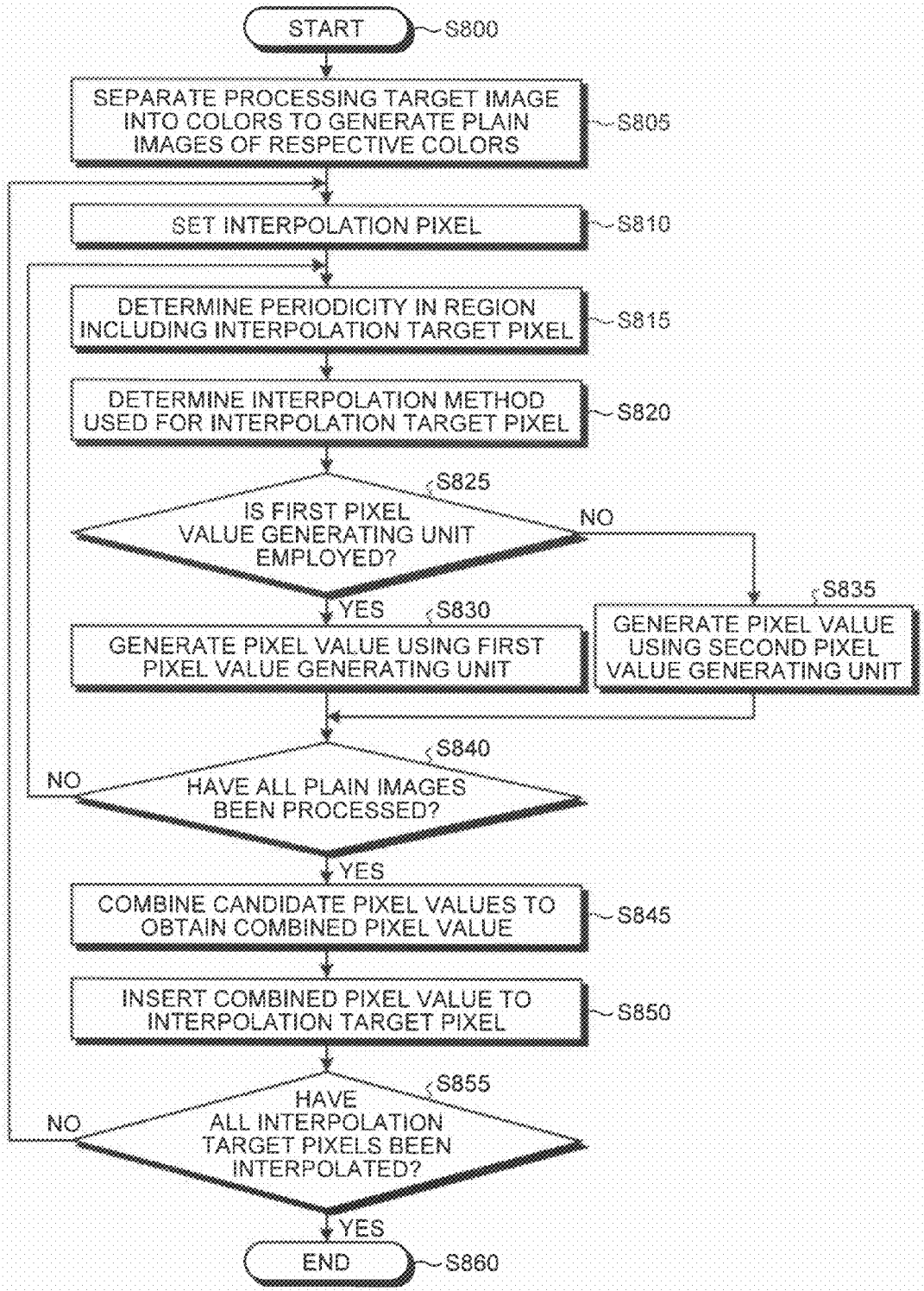

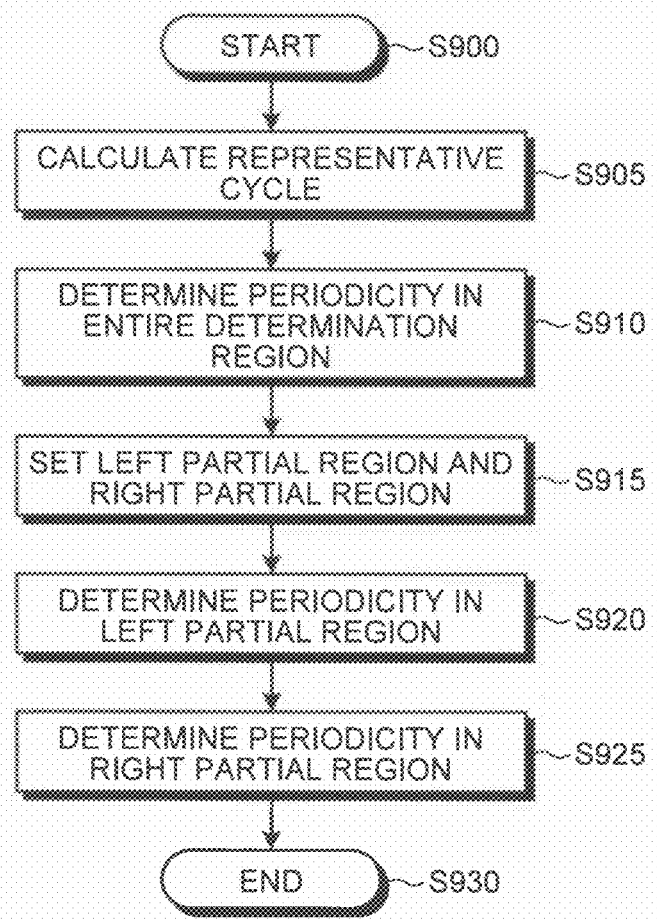

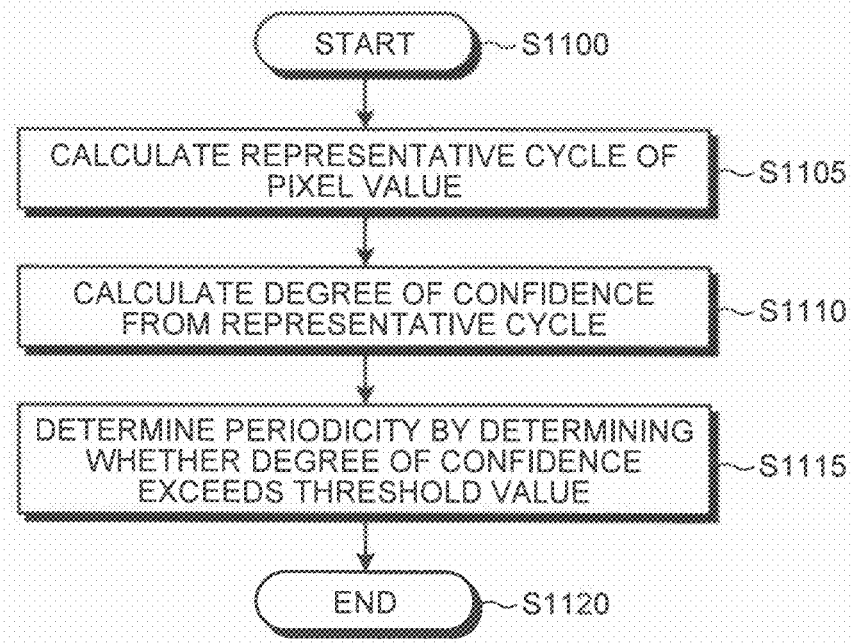

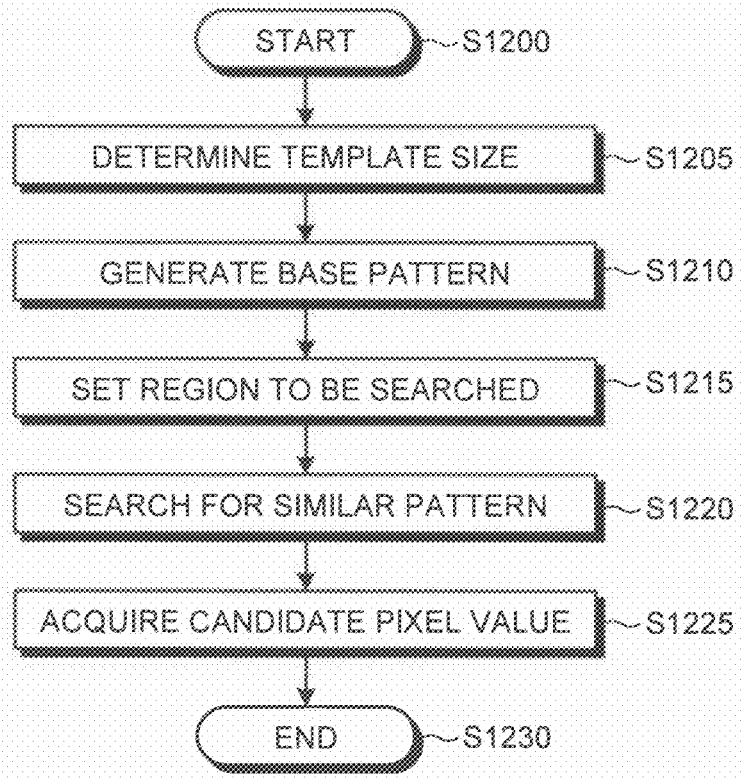

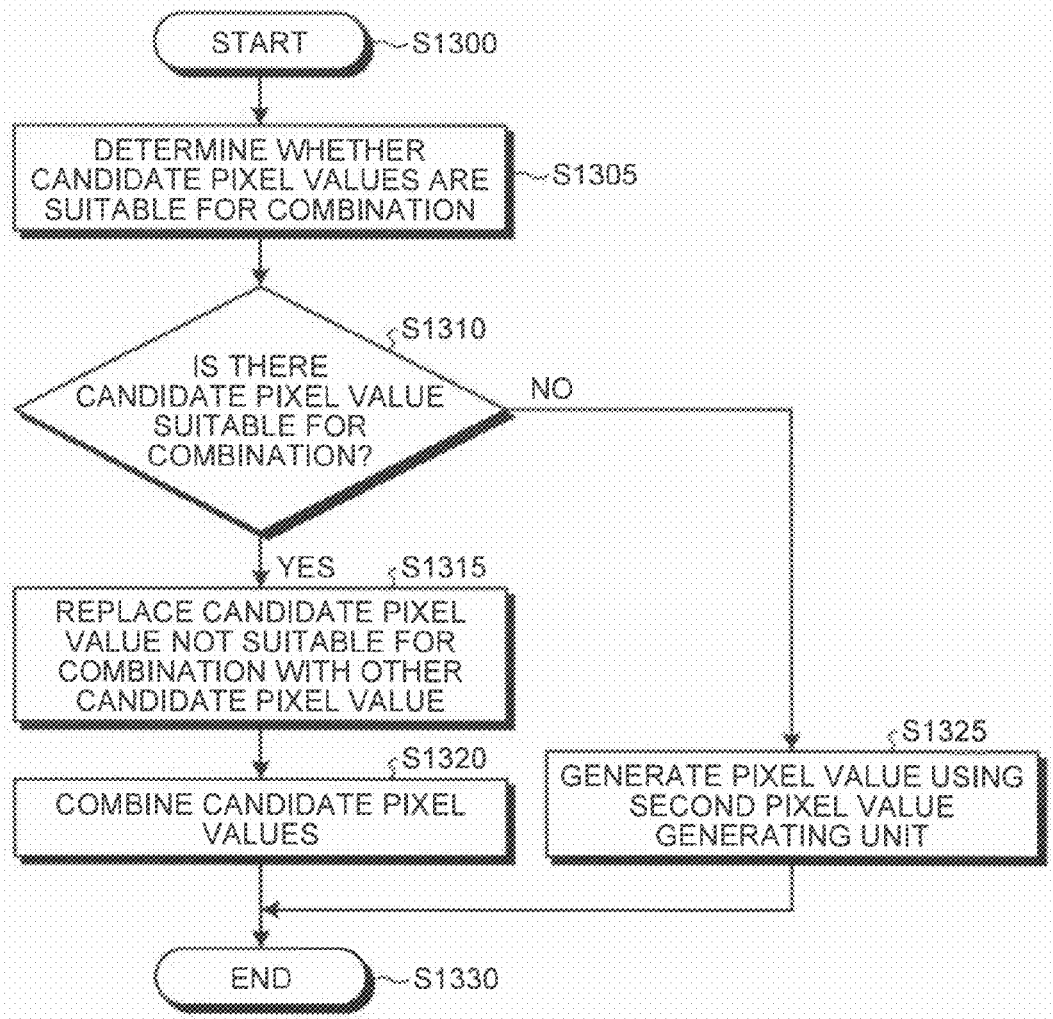

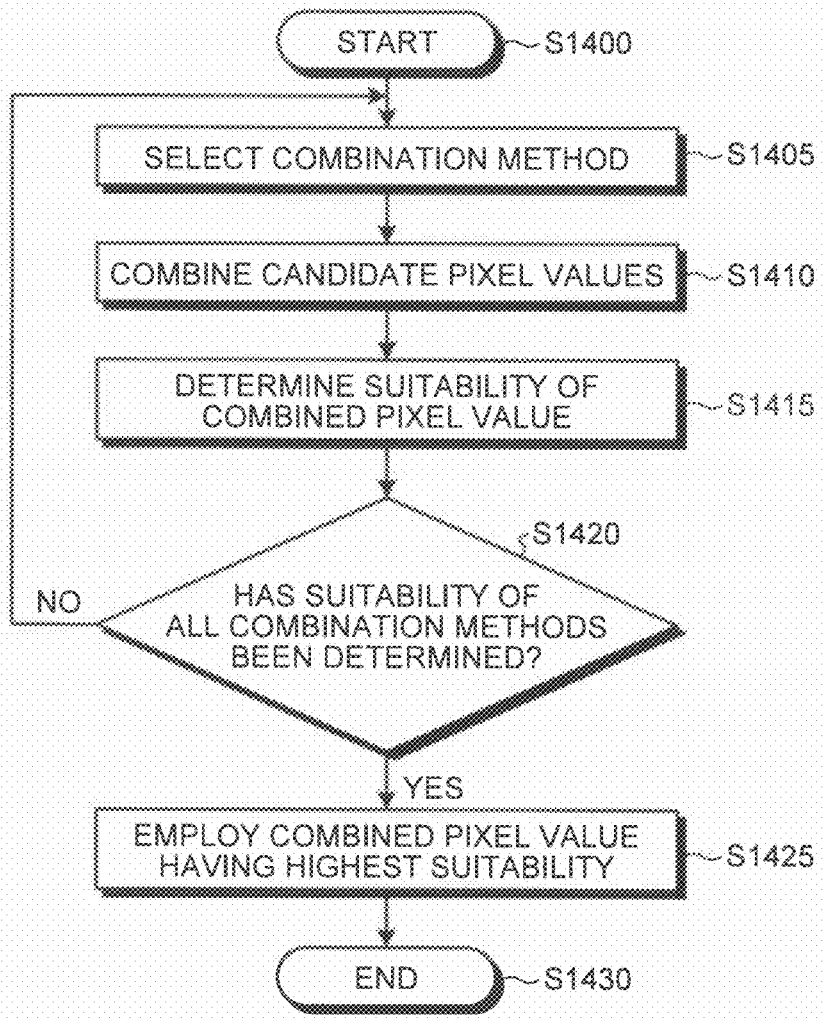

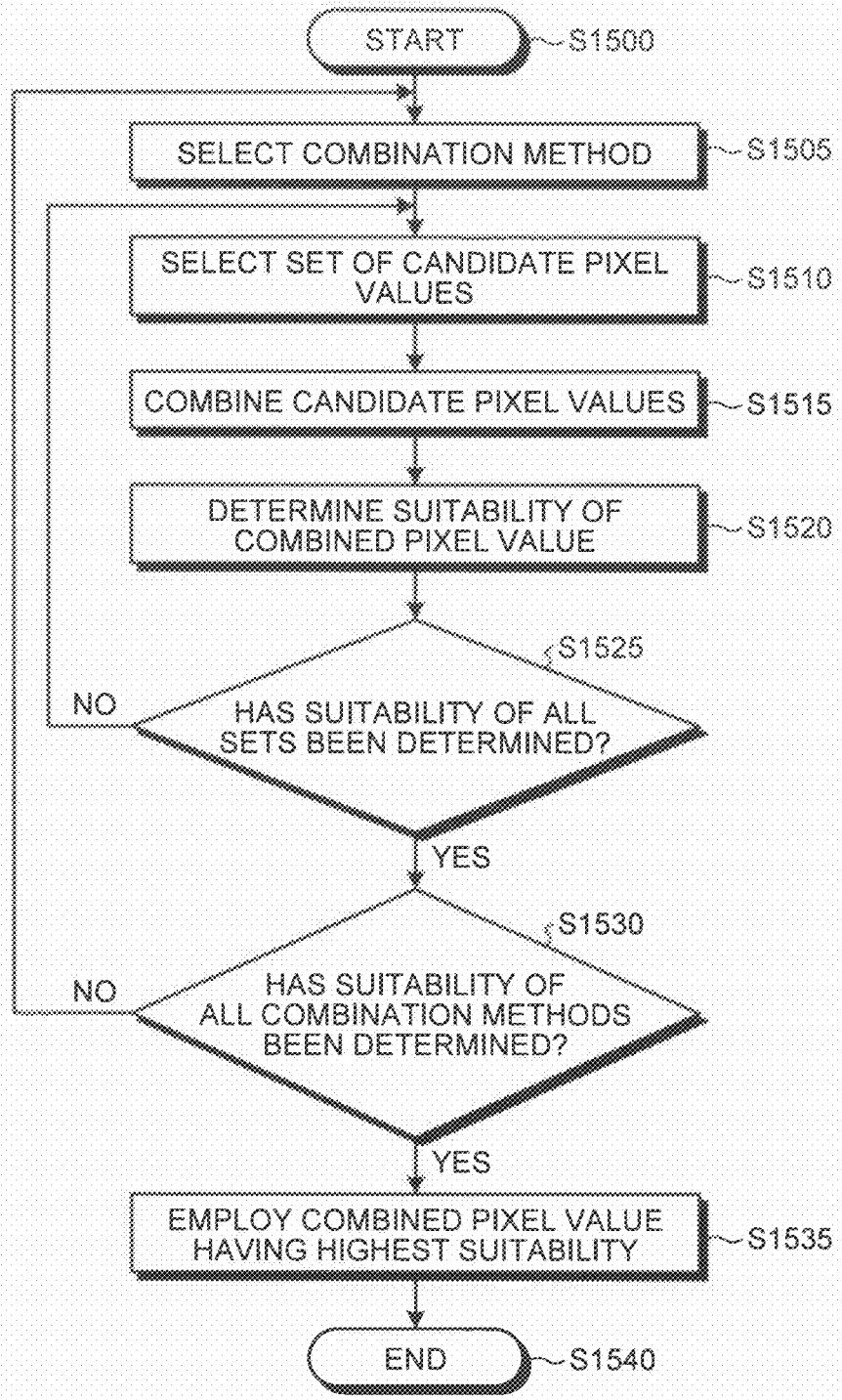

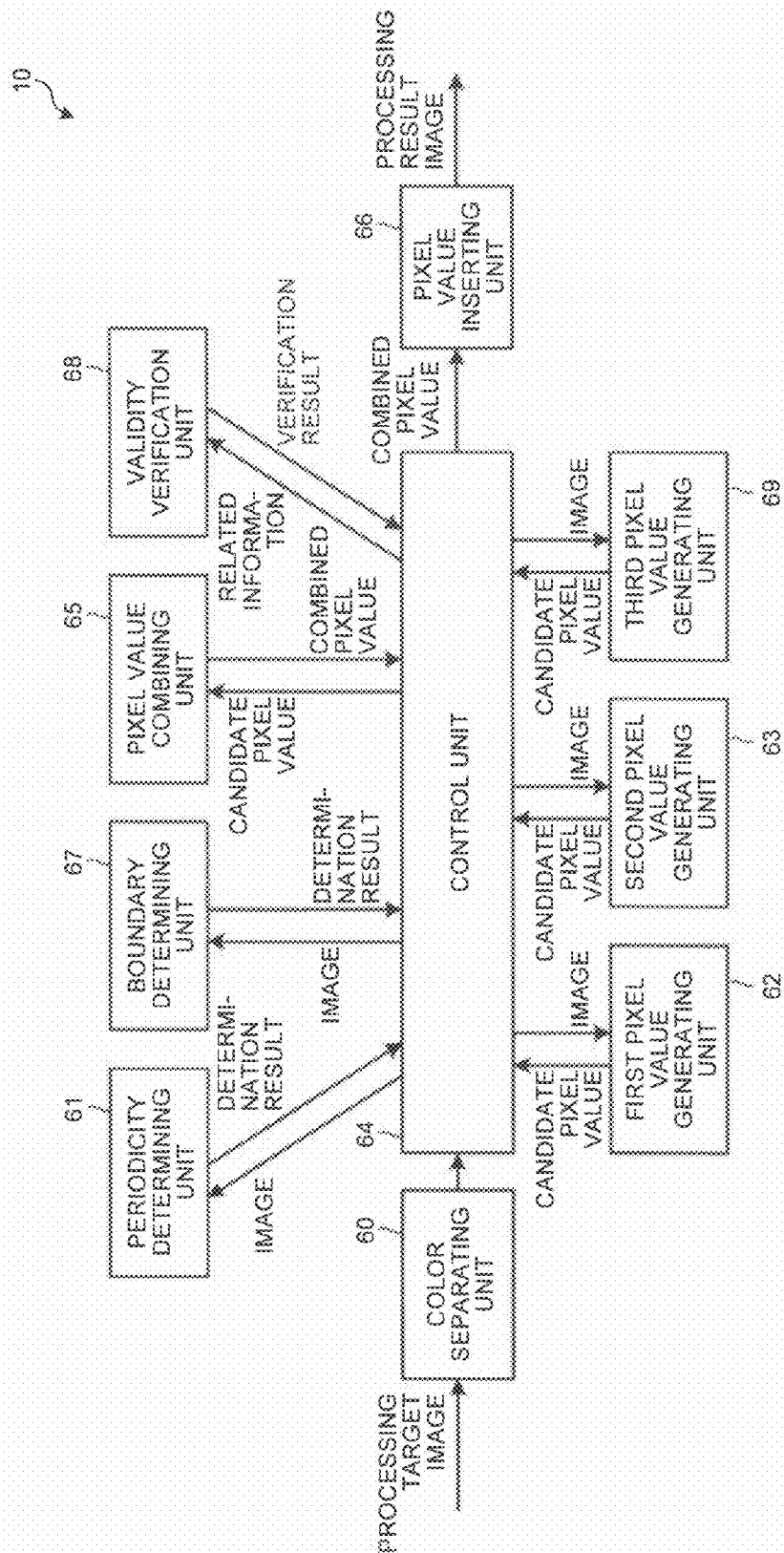

IMAGE PROCESSING APPARATUS AND PIXEL INTERPOLATION METHOD

CROSS-REFERENCE TO RELATED APPLICATIONS

The present application claims priority to and incorporates by reference the entire contents of Japanese Patent Application No. 2011-013839 filed in Japan on Jan. 26, 2011.

BACKGROUND OF THE INVENTION

1. Field of the Invention

The present invention relates to an apparatus that performs an interpolation process in order to interpolate a pixel value for a pixel having a missing pixel value or an incorrect pixel value in an image, and a pixel interpolation method performed by the apparatus.

2. Description of the Related Art

A scanner device that scans an image using an optical unit is classified into an apparatus that employs a contact image sensor (CIS) and an apparatus that employs a charge coupled device (CCD). The apparatus employing the CIS is unable to scan a stereoscopic document since the document needs to be in close contact with a surface to be scanned. However, in recent years, the device employing the CIS has been in widespread use due to its thin body and an inexpensive cost as compared to the device employing the CCD as well as an improvement in the technique of reducing noise that is likely to occur in a scanned image. For example, the CIS is used in an image scanning device having a one-pass duplex scanning function in order to scan the rear surface of a document.

The CIS uses RGB light emitting diodes (LEDs) as a light source, emits R, G, and B color lights to a document by switching them at a high speed to input the lights reflected from the document to an imaging element (CMOS image sensor) through a lens, converts the input lights from the document into voltage values pixel by pixel using the CMOS image sensor, and outputs the converted voltage values.

The scanner device employing the CIS employs a contact image sensor method of bringing a document into close contact with a sensor using a roller and scanning the document line by line. Since it is difficult to manufacture one lengthy sensor, the CIS has a configuration in which a plurality of short sensors are arranged in the length direction thereof to form a scanning unit. Thus, a certain gap is formed between the sensors, and it may not be possible to acquire an image signal in this gap. As a result, a deficiency in the image signal occurs.

Such a problem is not limited to the device employing the CIS. In a scanner device, the image signal may become deficient or the scanned image signal may have an incorrect value due to a defect of a sensor scanning the image signal or the presence of an obstacle in the midway of an optical path such as dust present on a contact glass on which a document is set.

As a result, there is a problem in that a pixel having a missing pixel value or an incorrect pixel value is present in a scanned image, and the image quality deteriorates. To solve this problem, in the related art, there is known a method of estimating a correct pixel value of a target pixel having a missing or incorrect pixel value from pixel values of the surrounding pixels thereof and interpolating (inserting) the estimated pixel value instead of the missing or incorrect pixel value of the target pixel.

For example, a method of performing linear interpolation using the pixel values of the surrounding pixels of a target pixel; and a method of performing polynomial interpolation or spline interpolation using a function of the second order or higher are known. The interpolation method based on linear interpolation is ideal for interpolation at portions of an image having a small change in density but is not ideal for interpolation at portions of an image having a severe change in density like a halftone dot region.

The interpolating method based on polynomial interpolation and spline interpolation can estimate pixel values with high accuracy when the sampling cycle for sampling an image such as a digital photograph is sufficiently shorter than the variation cycle of the image pattern. However, in the case of halftone dot images, since the image resolution is not sufficient as compared to the screen frequency of halftone dots, the sampling period is not sufficient in relation to the variation period of the image. Thus, the interpolating method may be unable to reproduce the original pattern correctly.

Thus, in order to solve the problem of the interpolating method, a method which uses pattern matching has been proposed. In this pattern matching method, it is possible to reproduce high-frequency components which could not be reproduced by the interpolating method using similar patterns at the position in the vicinity of the interpolation target pixel.

However, in general, since the pattern matching uses a large range of information as compared to the interpolating method, although the optimum solution to a base pattern is obtained, the obtained solution is not said to be optimum to the interpolation target pixel. This problem happens because when searching for similar patterns in the pattern matching method, patterns which are slightly different from each other as a whole are not distinguished from patterns which are mostly identical but partly greatly different from each other.

In particular, like a halftone dot region having a high screen ruling, when information is eccentrically distributed to specific pixels, a method of selecting similar patterns has a large effect on the interpolation result. Moreover, in a halftone dot region having a low density, since the proportion of pixels belonging to the background region of an image is relatively high, similar patterns may be detected in the background region rather than the halftone dot region, or alternatively, no similar pattern may be detected.

Therefore, when performing interpolation, it is necessary to use an interpolation method depending on the characteristics of a region to which the interpolation target pixel belongs. In order to accurately estimate the pixel value of the interpolation target pixel, there has been proposed a device in which when the position of an interpolation target pixel is within a halftone dot region, patterns similar to a pattern including the interpolation target pixel are searched for from an image, and the pixel value of a pixel, which is included in the most similar pattern and corresponds to the interpolation target pixel, is determined as the pixel value of the interpolation target pixel (see Japanese Patent No. 4330164).

This device determines whether the position of an interpolation target pixel corresponding to a connecting portion of contact image sensors is within a halftone dot region or a non-halftone dot region based on the image data scanned by an image scanning sensor. When the position of the interpolation target pixel is within the non-halftone dot region, the pixel data of the interpolation target pixel are generated by means of linear interpolation, and the generated pixel data is inserted into the interpolation target pixel. On the other hand, when the position of the interpolation target pixel is within the halftone dot region, the pixel data of the interpolation target pixel are generated by means of pattern matching, and the generated pixel data is inserted into the interpolation target pixel.

In this case, one base block including the interpolation target pixel and a plurality of reference blocks having the same size as the base block but not including the interpolation target pixel are set in an image region near the position of the interpolation target pixel. Then, the correlation values between the base block and the respective reference blocks are calculated based on the pixel data within the base block and the pixel data within the respective reference blocks. Among the pixel data within a reference block having the highest correlation value with the base block, the pixel data of a pixel corresponding to the interpolation target pixel within the base block are determined as the pixel data of the interpolation target pixel.

However, in this interpolation method, although high interpolation accuracy can be obtained for images in which the pixel values change smoothly, there is a problem in that the interpolation accuracy decreases for images in which the pixel values change abruptly.

Halftone dots used for color images are generally made up of dots of the three colors of C, M, and Y (cyan, magenta, and yellow) or the four colors of C, M, Y, and K. Thus, in order to perform accurate interpolation, it is necessary to reproduce dots of the individual colors. However, in the related art, a method of reproducing halftone dots of individual colors is not known.

Therefore, there is a demand for a device and a method capable of performing an interpolation process with high accuracy with respect to images of which the pixel values change abruptly and reproducing halftone dots of individual colors in a color image.

SUMMARY OF THE INVENTION

An image processing apparatus includes a color separating unit configured to separate a color image into a plurality of color components to generate images of respective colors; a periodicity determining unit configured to determine, for each of the images of the respective colors, whether an image region including a target pixel whose pixel value is to be interpolated is a periodic region in which pixel values vary periodically; a first pixel value generating unit configured to generate pixel values of the respective colors of a pixel using a first interpolation method; a second pixel value generating unit configured to generate pixel values of the respective colors of a pixel using a second interpolation method different from the first interpolation method; a control unit configured to determine, based on the determination result obtained by the periodicity determining unit, which one of the first and second pixel value generating units is to be used for generating pixel values of the respective colors of the target pixel; and a pixel value combining unit configured to combine candidate pixel values which are the pixel values of the respective colors of the target pixel and which are generated by the first or second pixel value generating unit determined by the control unit to calculate a combined pixel value for interpolating the target pixel.

A pixel interpolation method is performed in an image processing apparatus that includes a first pixel value generating unit to generate a pixel value of a pixel using a first interpolation method, and a second pixel value generating unit to generate a pixel value of a pixel using a second interpolation method different from the first interpolation method. The pixel interpolation method includes separating the color image into a plurality of color components to generate images of respective colors; determining, for each of the images of the respective colors, whether an image region including a target pixel whose pixel value is to be interpolated is a periodic region in which pixel values vary periodically; determining, based on the determination result obtained in the determining of periodicity of the image region, which one of the first and second pixel value generating units is to be used for generating pixel values of the respective colors of the target pixel; and combining candidate pixel values which are the pixel values of the respective colors of the target pixel and which are generated by the first or second pixel value generating unit determined in the determining of the pixel value generating unit to calculate a combined pixel value for interpolating the target pixel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A to 5C are diagrams illustrating an example of a periodic region and a non-periodic region;

FIG. 8 is a flowchart illustrating the flow of a pixel interpolation process executed by the image processing apparatus illustrated in FIG. 2;

FIG. 9 is a flowchart illustrating the flow of a process performed in step S815 illustrated in FIG. 8;

FIG. 11 is a flowchart illustrating a detailed process of the periodicity determination performed in steps S910, S920, and S925 illustrated in FIG. 9;

FIG. 12 is a flowchart illustrating the flow of a process performed in step S830 illustrated in FIG. 8;

FIG. 13 is a flowchart illustrating an example of a process performed in step S845 illustrated in FIG. 8;

FIG. 14 is a flowchart illustrating another example of the process performed in step S845 illustrated in FIG. 8;

FIG. 15 is a flowchart illustrating still another example of the process performed in step S845 illustrated in FIG. 8;

FIG. 16 is a functional block diagram illustrating another embodiment of the image processing apparatus.

DETAILED DESCRIPTION OF THE PREFERRED EMBODIMENTS

An image processing apparatus of the present invention is connected directly by a cable, or through a network, to a scanner device that reads color images. Although the scanner device is not limited to this, in this example, the scanner device is assumed to be a scanner device employing a CIS. The image scanned by the scanner device includes a pixel which having a missing pixel value or an incorrect pixel value due to the gap between sensors. Therefore, the image processing apparatus performs an interpolation process including calculating a correct pixel value of that pixel (interpolation target pixel) and setting the calculated pixel value to the interpolation target pixel, so as to interpolate the interpolation target pixel with the calculated pixel.

The image processing apparatus is a device configured to receive the input of a color image to be subjected to an interpolation process, separate the color image into plain images made up only of the respective colors, calculates candidate pixel values from the plain images as pixel values to be inserted to the interpolation pixel, combines the candidate pixel values calculated for the respective colors to generate one pixel value, and inserts the combined pixel value into the interpolation target pixel, so as to interpolate the interpolation target pixel with the combined pixel value.

When the image is a grayscale image in which one pixel is expressed by 8 bits, the pixel value takes the value of 0 for black and 255 for white. When the image is a color image in which one pixel is expressed by 8 bits for each color of R, G, and B, the pixel value takes a value in the range of 0 to 255 for each color of red, green, and blue. All pixel values take the value of 0 for black, and all pixel values take the value of 255 for white.

To realize these processes, the image processing apparatus is configured to include a storage device in which a program capable of executing the processes is recorded, such as a PC, a workstation, a server, or an MFP, a processor that reads and executes the program, and an interface for connecting to the scanner device and the network.

Figure 1:
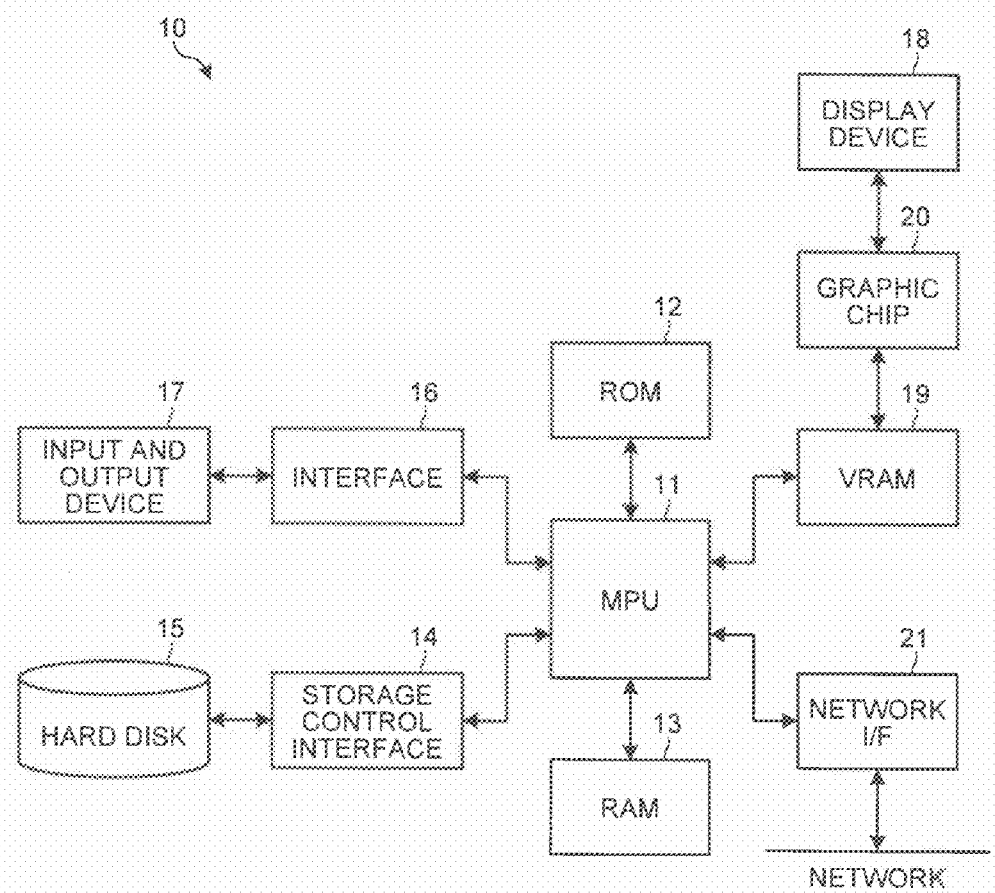
FIG. 1 is a diagram illustrating an example of a hardware configuration of an image processing apparatus according to the present invention.

Specifically, as illustrated in FIG. 1, an image processing apparatus 10 may include a microprocessor unit (MPU) 11 as the processor, for example. Moreover, the image processing apparatus 10 may be configured to include a read only memory (ROM) 12 which is a nonvolatile memory storing a basic input output system (BIOS) and a firmware as the storage device and a random access memory (RAM) 13 providing an execution and storage area for allowing program processing by the MPU 11.

The MPU 11 is connected to a storage control interface 14 which is one kind of interface through an internal bus. The MPU 11 accesses a hard disk 15 which is one of the storage devices connected to the storage control interface 14 and reads, executes, and writes various kinds of application and data. As the storage control interface 14, an interface that controls the input and output of the hard disk 15 in accordance with the standards such as integrated device electronics (IDE), AT attachment (ATA), serial ATA, or Ultra ATA. The MPU 11 can control a serial or parallel interface 16 such as a universal serial bus (USB) or the IEEE 1394 through the internal bus, communicate with an input and output device 17 such as a keyboard, a mouse, or a printer, and receive the input from the user.

The image processing apparatus 10 can be configured to include a video RAM (VRAM) 19 and a graphic chip 20 that process video signals in response to instructions from the MPU 11 and display video on a display device 18 and a network I/F 21 connected to a network to communicate with other devices through the network. The VRAM 19 is a RAM used as a storage device for displaying video on the display device 18, and the graphic chip 20 is an integrated circuit that processes image data.

Moreover, the image processing apparatus 10 may be configured such that the MPU 11 reads programs stored in the ROM 12, the hard disk 15, and other storage devices (not illustrated) such as an NVRAM or an SD card and expands the programs in the memory area of the RAM 13 to realize respective processes described later under a suitable operating system (OS), whereby the MPU 11 is configured as respective units for realizing the respective processes. As the OS, the Windows (registered trademark), the UNIX (registered trademark), the LINUX (registered trademark), and the like can be employed. The image processing apparatus 10 is not limited to the above-described PC or the like, but may be configured as an application specific integrated circuit (ASIC) in which a plurality of functional circuits are integrated into one circuit for a specific application.

Figure 2:
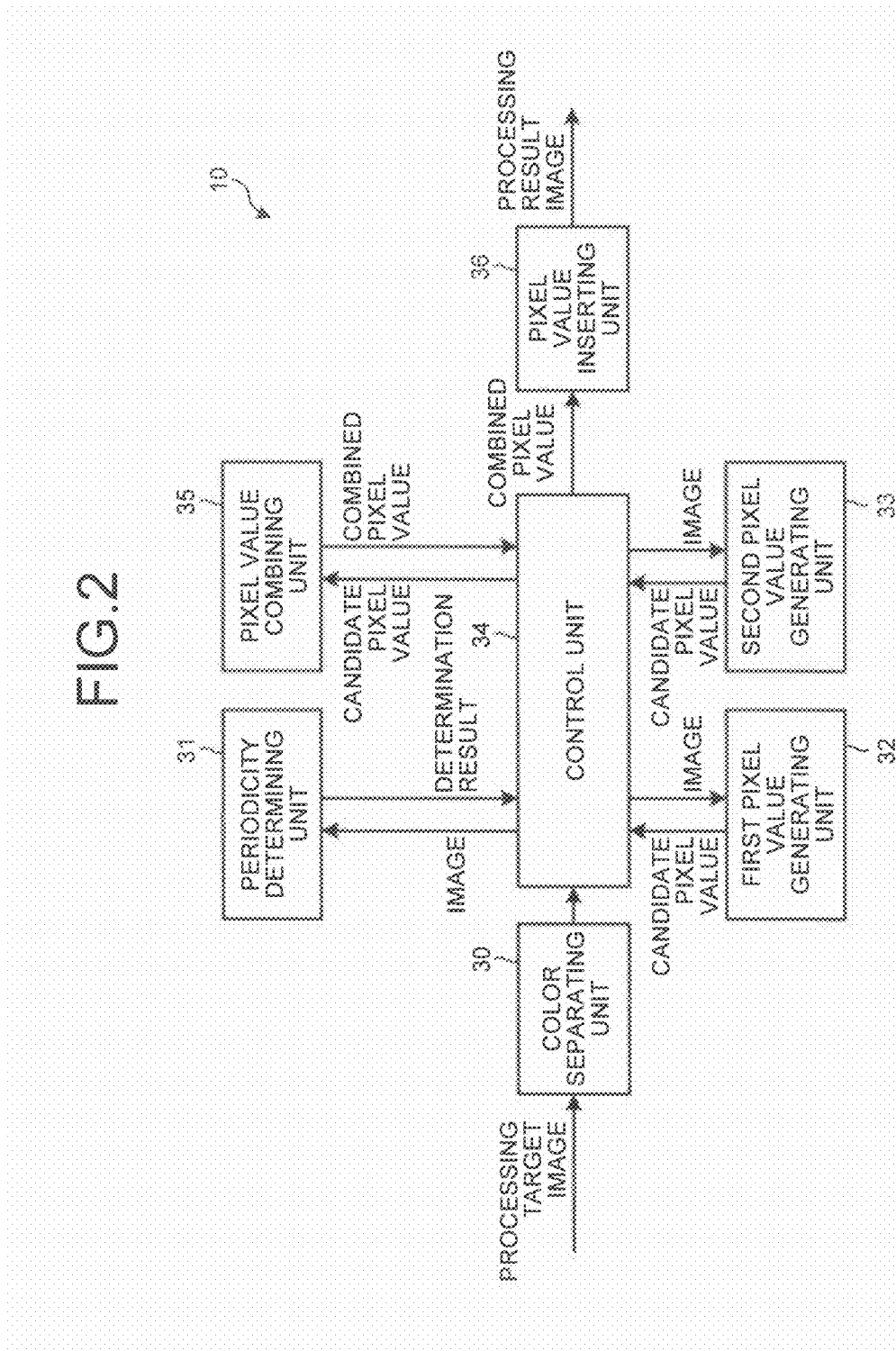
FIG. 2 is a functional block diagram illustrating an embodiment of the image processing apparatus.

FIG. 2 is a functional block diagram illustrating a first embodiment of the image processing apparatus. As described above, the image processing apparatus 10 can realize respective functions by causing the MPU 11 which is a process to read and execute the programs stored in the storage device such as the ROM 12 or the hard disk 15. That is, the image processing apparatus 10 is configured to include a color separating unit 30, a periodicity determining unit 31, a first pixel value generating unit 32, a second pixel value generating unit 33, a control unit 34, a pixel value combining unit 35, and a pixel value inserting unit 36. Although not illustrated in FIG. 2, the image processing apparatus 10 may further include a pixel specifying unit that specifies (detects) an interpolation target pixel.

The color separating unit 30 receives image data of a color image to be subjected to an interpolation process, separates the color image into a plurality of color components designated in advance, and generates plain images which are grayscale images of the respective colors made up only of the respective color components. The color image is generally made up of the three colors of RGB (red, green, and blue) in the case of digital images. The color separating unit 30 separates the color image into color components of CMY (cyan, magenta, and yellow), CMYK (cyan, magenta, yellow, and black), RGB, Lab, or YIQ. For example, the color separating unit 30 can separate the color image using light having passed through color filters of the respective colors of RGB to thereby generate plain images.

The Lab is made up of three values of "L" representing lightness, "a" representing a hue element in the green-red range, and "b" representing a hue element in the blue-yellow range. The YIQ is made up of three values of "Y" representing luminance, "I" representing a color difference in the orange-cyan range, and "Q" representing a color difference in the violet blue-yellow green range.

A halftone region of a printed material is preferably separated into the color components of CMYK since the gradation is expressed by halftone dots of the four colors of CMYK. However, since RGB and CMY are in a complementary relation, and cyan, magenta, and yellow halftone dots appear as light and dark patterns in plain images (R, G, and B plain images) of the red, green, and blue components, respectively, no serious problem may occur even the halftone region is separated into the color components of RGB. Although black halftone dots appear in the plain images of all the colors of red, green, and blue, the black dots can be reproduced indirectly by performing the interpolation process without discriminating black halftone dots from the halftone dots of CMY and reproducing halftone dot patterns appearing in the plain images of RGB.

The color separation performed by the color separating unit 30 may be performed upon receiving a color image to be subjected to an interpolation process. Alternatively, it may be performed after the pixel specifying unit detects an interpolation target pixel. Moreover, the color separation may be performed only for color images and may not be performed for images made up of one color such as a black and white image since color separation needs not be performed. In the case of color images, by directly detecting a target pixel from the color image, extracting a specific color component value from the pixel value of the detected pixel, and using the color component value, the color separation for creating plain images needs not to be performed.

Subsequently, the above-described pixel specifying unit detects, from a processing target image, an interpolation target pixel whose pixel value is to be inserted thereto. The position of the interpolation target pixel may be detected by the user in advance and may be detected sequentially by the device. The position can be expressed as the coordinates (x, y) using the coordinates of the left bottom corner as the base coordinates (0, 0), where "x" is the number of pixels in the same rightward direction as the main-scanning direction and "y" is the number of pixels in the upward direction.

As the detection method used when the image processing apparatus 10 detects the interpolation target pixel, there is a method of detecting the interpolation target pixel by checking the pixel value for each pixel to determine whether the pixel has a brightness and a color designated in advance. Moreover, there is a method of detecting the interpolation target pixel by evaluating a difference in pixel value from the correct pixel value obtained by scanning a known image. Furthermore, there is a method of detecting the position at which the periodicity of pixel values in the horizontal or vertical direction becomes discontinuous and detecting a pixel at that position as the interpolation target pixel. The interpolation target pixel may be an isolated dot and may be a line segment made up of continuous dots. The reason why the interpolation target pixel may be a line segment is because the gap may be formed to be continuous in the sub-scanning direction which is the moving direction of the imaging element and formed by a line segment made up of continuous dots.

In general, although the position of the interpolation target pixel is set equally for all plain images, when it is desired to interpolate (insert) only a specific color component value, the interpolation target pixel may be set in only the plain image of that color.

Figure 3:
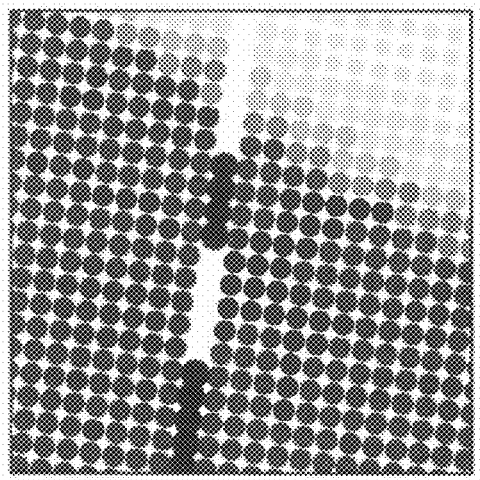
FIG. 3 is a diagram illustrating an example of an image including an interpolation pixel.

An example of an image including the interpolation target pixel may include one in which a vertical stripe occurs within a halftone dot image in which black dots having approximately the same size are arranged approximately regularly as illustrated in FIG. 3. The vertical stripe is made up of a portion where dots are missing and a portion where dots are larger than the surrounding dots so as to cross the central portion of the image. Such an image has periodicity since dots are arranged at certain intervals, but the periodicity becomes discontinuous in the vertical stripe portion. Thus, the interpolation target pixel can be detected by detecting the position at which the horizontal periodicity becomes discontinuous.

The periodicity determining unit 31 specifies a determination region of a predetermined size so as to include the interpolation target pixel of the plain image and determines whether a variation in the pixel values within the determination region has periodicity. The determination region may be a region having a height corresponding to one pixel including the interpolation target pixel, namely one line of the image, or alternatively, may be a rectangular region having an optional height including the interpolation target pixel.

The size of the determination region may be set by the user in advance and may be specified dynamically by the device. When the size is dynamically specified by the device, the interpolation process is performed once with a size designated in advance. Then, if the interpolation process can be sufficiently performed with a smaller size, the determination region may be decreased by a certain proportion. Conversely, if the interpolation process cannot be performed with the smaller size, the determination region may be increased by a certain proportion.

Figure 4A:
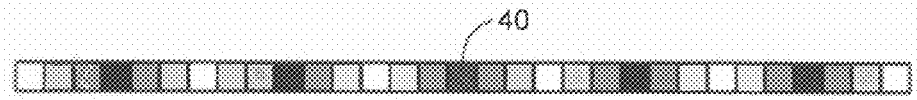
FIGS. 4A and 4B are diagrams illustrating an example of a determination region and the relation between the position of a pixel in the horizontal direction of the determination region and the pixel value thereof.
Figure 4B:
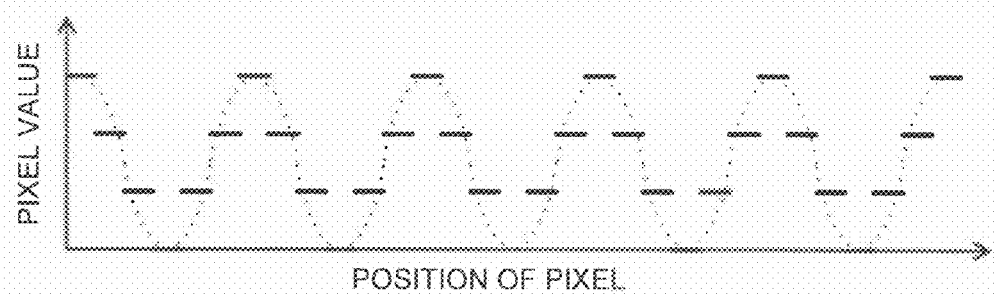

An example in which one line of the image is extracted and used as the determination region is illustrated in FIGS. 4A and 4B. In FIG. 4A, pixels representing black halftone dots and pixels representing a white background are arranged at certain intervals, and gray pixels having different pixel values are arranged between them so as to give gradation. In FIG. 4A, a pixel 40 having a missing pixel value due to the gap is shown.

FIG. 4B illustrates an example of the relation between the positions of pixels in the horizontal direction of the determination region and the pixel values thereof. The pixel values of the pixels have discrete values since each pixel value is constant with the pixel, but when the pixel values are smoothly connected, the pixel values can be expressed as a waveform in which the pixel values increase and decrease with a constant cycle. Thus, in this determination region, it is possible to detect the periodicity of variation in the pixel values.

An example of a determination region having periodicity may be a halftone dot region represented by halftone dots or hatched lines illustrated in FIG. 5A. On the other hand, an example of a determination region having no periodicity may be a discontinuous region made up of a character or irregularly arranged dots illustrated in FIG. 5B and a flat region such as a background represented by one color or gradation illustrated in FIG. 5C.

In the case of a halftone dot image represented by halftone dots, since dots are actually arranged in a linear form with an optional screen angle, the dots are obliquely arranged at certain intervals rather than being arranged at certain intervals in the horizontal direction. Thus, although the halftone dot image does not have such a waveform having the same amplitude as illustrated in FIG. 4B, since the halftone dot image has a waveform which has peaks of different amplitudes at certain intervals, it can be determined that the halftone dot image has periodicity.

Although the presence of periodicity can be easily determined by illustrating in a diagram as in FIG. 3 or FIGS. 4A and 4B, it is practically difficult to create diagrams and make determination with reference to the diagrams. Therefore, for example, the periodicity can be determined by setting a determination region which is a region having a predetermined size including the interpolation target pixel of a plain image, calculating the variation cycle within the determination region, and determining the presence of periodicity of the determination region using the calculated variation cycle. Thus, the periodicity determining unit 31 may include a cycle calculating unit (not illustrated) for calculating the variation cycle.

Although it is necessary to calculate the variation cycle in order to determine periodicity, it cannot be said that the variation cycle of the pixel values within the determination region is always constant. Therefore, a representative cycle is employed as the variation cycle used for determining periodicity. As a calculation example of the representative cycle, the positions (peak positions) at which the pixel values reach their local maximum within the determination region, i.e., the positions of pixels each having a peak value in the positive direction of the waveform illustrated in FIG. 4B are recorded, the histogram of distance from a certain peak position to the next peak position is created over the entire determination region, and then, the distance corresponding to the maximum frequency which is the value of a class having the largest frequency is employed as the representative cycle. The representative cycle can be expressed by the number of pixels. In the example illustrated in FIGS. 4A and 4B, peaks occur at intervals of approximately 6 pixels, and the distance between the adjacent peaks is mostly 6 pixels. Therefore, the representative cycle is set to 6 pixels. Alternatively, a distance of "representative cycle±1" may be used from the perspective of allowing a certain degree of error in the representative cycle.

In this case, the representative cycle may be calculated using the positions at which the pixel values reach their local minimum, i.e., the positions of pixels each having a peak value in the negative direction of the waveform illustrated in FIG. 4B rather than using the positions at which the pixel values reaches their local maximum. Noise resistance is low if the representative cycle is calculated using the periodicity of variation in the pixel values. In contrast, if autocorrelation of the pixel values is calculated and the periodicity of the variation thereof is used, noise resistance increases. Thus, when calculating the representative cycle using the positions at which the pixel values reach their local maximum and the positions at which the pixel values reach their local minimum, it is preferable to use autocorrelation. The reason why the noise resistance increases is because noise is superimposed on the pixel values in many cases, the effect of noise can be suppressed to be low by using autocorrelation derived from a plurality of sets of the pixel values rather than directly using the pixel values.

Autocorrelation is correlation between a certain signal and a signal having a predetermined phase shift relative to the certain signal. In this case, autocorrelation is calculated within a determination region, a histogram is created using the autocorrelation value instead of the pixel value, and the most frequency value is employed as the representative cycle. As the autocorrelation value, a correlation coefficient may be used, and a covariance may be used to make calculation easier.

Here, covariance S is an index representing the magnitude of covariation of two pixel values and can be calculated by Expression (1) below in which "$x_i$" is a pixel value of the i-th pixel in one of the two comparison patterns, "$y_i$" is a pixel value of the i-th pixel in the other pattern, "$x_m$" is the average value of the pixel values in the one pattern, "$y_m$" is the average value of the pixel values in the other pattern, and "n" is the number of pixels in the pattern.

$$S = \frac{1}{n}\sum_{i=1}^{n} (x_i - x_m)(y_i - y_m) \tag{1}$$

The correlation coefficient R is an index representing the degree of similarity between two random variables and can be calculated by Expression (2) below in which "$\sigma_x$" is a standard deviation of one pattern, and "$\sigma_y$" is a standard deviation of the other pattern.

$$R = \frac{\sum_{i=1}^{n}(x_i - x_m)(y_i - y_m)}{\sigma_x \sigma_y} \tag{2}$$

Degree of confidence $C_v$ can be calculated using Expression (3) below, for example. In Expression (3), "T" is the representative cycle calculated above, "$F_r$" is the frequency of the distance corresponding to the representative cycle T in the histogram, and "N" is the number of pixels in the determination region. As the "$F_r$", the sum of the frequencies of T±1 may be used in order to allow errors when estimating the representative cycle as well as the frequency of the representative cycle T. Expression (3) defines, as the degree of confidence, the proportion of pixels having the same distance between the peak positions as the representative cycle to the pixels included in the entire determination region.

$$C_v = \frac{T \times F_r}{N} \tag{3}$$

When the degree of confidence is higher than a threshold value, the determination region is determined to have periodicity. When the degree of confidence is equal to or smaller than the threshold value, the determination region is determined to have no periodicity. The threshold value can be set by the user in advance, or alternatively, can be determined dynamically. When the threshold value is set by the user in advance, the threshold value can be determined and set by performing simulations or tests and calculating the degree of confidence ideal for determining the presence of periodicity. When the threshold value is determined dynamically, an intermediate value of the degrees of confidence, which are actually calculated with respect to a halftone dot region having periodicity and either one of a discontinuous region and a flat region having no periodicity, can be determined as the threshold value.

The first pixel value generating unit 32 generates the pixel value of an interpolation target pixel using a pattern matching method as an interpolation method. As a specific example of the pattern matching method, template matching can be used. The template matching can be performed by using a template as a base pattern which is a designated position or an image region having a designated size within an image and finding positions resembling the template to thereby calculate the degree of coincidence between the template and the patterns within the image.

In realize this function, first, the first pixel value generating unit 32 determines the size of the template. The width of the template is set based on the representative cycle calculated in the above-described manner. Although the width of the template can be made to be identical to the width of the representative cycle, the width is not limited to this. The width may be slightly larger or smaller by one pixel to each of the left and right sides than the number of pixels corresponding to the width of the representative cycle. Next, the height of the template may be set to be identical to the height of the representative cycle similarly to the width. The height is not limited to this, but may be slightly larger or smaller. Although the width and height are set to be larger or smaller by one pixel to each of the left and right sides, the width and height may be set to be larger or smaller by two pixels or more.

Figure 6A:
FIGS. 6A and 6B are diagrams illustrating an example of an image showing a representative cycle and a template.
Figure 6B:
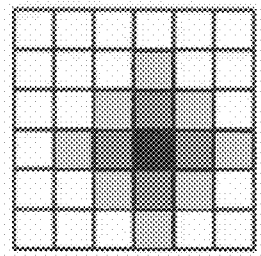

When the interpolation target pixel belongs to the halftone dot region, the template is preferably set as a square region of which one side is approximately the representative cycle. This is because, when an image representing the representative cycle is such an image having a width of 14 pixels and height of one pixel as illustrated in FIG. 6A, by setting the template as a square region having a width of 14 pixels and a height of 14 pixels, it is possible to express one halftone dot as illustrated in FIG. 6B. As above, by setting the size of the template as a region corresponding to one halftone dot, when searching for a similar pattern, it is possible to a similar pattern optimal to a halftone dot including the interpolation target pixel using information of only one halftone dot.

Moreover, when the representative cycle is as very small as 3 pixels, for example, the size of the template may be set to be as slightly larger as 5 pixels by adding one pixel to each of the left and right side of the 3 pixels. This is because, when the representative cycle is very small, the number of pixels used for evaluation of the degree of coincidence becomes so small that the stability of detection of similar pattern decreases.

The first pixel value generating unit 32 cuts a region including the interpolation target pixel from the plain image based on the size of the template determined in the above-described manner and sets the cut region as the template. In this case, the template is preferably cut and set as a shape which is horizontally and vertically symmetrical about the interpolation target pixel. By cutting and setting the template in this way, it is possible to search for a similar pattern without depending on the directionality of the pattern including the interpolation target pixel.

Subsequently, the first pixel value generating unit 32 sets a predetermined region to be searched when searching for a similar pattern similar to the template using the template. The region to be searched can be set based on the representative cycle. When the image representing the representative cycle is the image having the width of 6 pixels and the height of one pixel, for example, the region to be searched can be set as a square region having a width of 18 pixel and a height of 18 pixels the same as the width by adding 6 pixels to each of the left and right sides of the representative cycle. As above, by setting the region to be searched as a region having the same number of pixels in width and height, it is possible to perform searching without depending on the directionality of the pattern in the range to be searched. The above region having the width of 18 pixels and the height of 18 pixels is just an example but is not limited to this. Instead, a larger region having a width of 30 pixels and a height of 30 pixels, for example, may be set as the region to be searched.

Although the region to be searched is not limited to the above square region, when it is necessary to suppress the height of the range to be low due to restriction or the like of an image buffering memory, it is preferably to increase the width by that much. This is because, when the height is suppressed to be low, the number of targets to be searched to retrieve a similar pattern decreases, and the accuracy of interpolation decreases. Moreover, when the periodicity determining unit 31 determines that a region positioned at the left side of the interpolation target pixel has no periodicity, it is preferable to exclude the region positioned at the left side of the interpolation target pixel from the searching region. The same is true for the right side. By narrowing the region to be searched in this way, it is possible to prevent such detection errors that a similar pattern is retrieve from a region in which the similar pattern should not to be retrieved.

After setting the region to be searched in the above-described manner, the first pixel value generating unit 32 searches for a similar pattern present within the region to be searched using the generated template. Specifically, the degree of coincidence with the template at respective positions within the region to be searched is calculated, and the position having the highest degree of coincidence is selected as the similar pattern. As the degree of coincidence, the degree of dissimilarity such as sum of absolute difference (SAD) or sum of squared difference (SSD) and the degree of similarity such as a correlation coefficient or a covariance can be used.

The SAD is obtained by cutting patterns to be compared with the template, calculating a difference in luminance value between the pixel in the template and the pixel in each of the cut patterns, which are positioned at the same pixel positions, and calculating the sum of the absolute values of the differences. The degree of similarity increases as the sum decreases, and the degree of dissimilarity increases as the sum increases. On the other hand, the SSD is obtained by calculating the square of each difference in luminance value and calculating the sum of the squares. The degree of similarity increases as the sum decreases, and the degree of dissimilarity increases as the sum increases. The correlation coefficient and the covariance can be calculated by Expressions (1) and (2) above. The correlation coefficient takes a value in the range of "−1" to "1", in which a strong positive correlation occurs as the value approaches 1, a weak correlation occurs as the value approaches 0, and a negative correlation occurs as the value approaches −1. This means that two patterns are similar as the value approaches 1, and that one pattern is similar to an inverted version of the other pattern as the value approaches −1. From this, it can be determined that the degree of similarity is high as the value increases. Since the covariance corresponds to the correlation coefficient, it can be determined that the degree of similarity is high as the value increases.

When evaluating the degree of coincidence, it is preferable to exclude the interpolation target pixel from pixels used for the calculation of the degree of coincidence so that the pixel value of the interpolation target pixel does not affect the degree of coincidence, or preferable to set, as the interpolation target pixel, a virtual pixel value by using the pixel value of a pixel of a comparison target pattern at the same position as the interpolation target pixel. A plurality of similar patterns may be selected in descending order of the degrees of coincidence.

Moreover, when there are a plurality of interpolation target pixels in the entire image, at the time of calculating the degree of coincidence, it is preferable to exclude other interpolation target pixels from pixels used for the calculation as well as an interpolation target pixel into which its pixel value is presently being inserted, or preferable to set, as the interpolation target pixel, a virtual pixel value by using the pixel value of a pixel of the comparison target pattern at the same position. This is because not only the interpolation target pixel into which its pixel value is presently being inserted but also other interpolation target pixels are included in a base pattern or a comparison target pattern, and the interpolation target pixel basically has a missing pixel value or holds an incorrect pixel value, it is not preferable to use such interpolation target pixels in calculation of the degree of coincidence. The pixel value of the interpolation target pixel into which its pixel value has already been inserted can be used for the calculation of the degree of coincidence. Moreover, when other interpolation target pixels are included in the comparison target pattern, it is preferable to exclude them from pixels used for the calculation, or preferable to set a virtual pixel value by using the pixel value of a pixel of the base pattern at the same position.

For example, it is assumed that a template including interpolation target pixels is made up of pixels of 5 rows by 5 columns from a pixel $a_{i-2}, a_{j-2}$ to a pixel $(a_{i+2}, a_{j+2})$, and all the pixels on the i-th column are to be interpolated. It is also assumed that a pixel $(a_i, a_j)$ is presently being interpolated, the interpolation pixels are sequentially processed, and pixel values have already been inserted to the pixels $(a_j, a_{j-2})$ and $(a_i, a_{j-1})$ on the same i-th column. In this condition, a first exemplary method of calculating the degree of coincidence is to perform the calculation by excluding the interpolation target pixels $(a_i, a_{j-2})$, $(a_i, a_{j-1})$, $(a_i, a_j)$, $(a_i, a_{j+1})$, and $(a_i, a_{j+2})$. A second exemplary method is to perform the calculation by setting a virtual pixel value to the interpolation target pixels $(a_i, a_{j-2})$ $(a_i, a_{j-1})$ $(a_i, a_j)$ $(a_i, a_{j+1})$, and $(a_i, a_{j+2})$ using the pixel values of pixels of the comparison target pattern at the corresponding positions.

A third exemplary method is to perform the calculation by using the already-inserted pixel values of the interpolation target pixels $(a_i, a_{j-2})$ and $(a_i, a_{j-1})$ while excluding the other interpolation pixels $(a_i, a_j)$, $(a_i, a_{j+1})$, and $(a_i, a_{j+2})$. A fourth exemplary method is to perform the calculation by using the already-inserted pixel values of the interpolation pixels $(a_i, a_{j-2})$ and $(a_i, a_{j-1})$ while setting a virtual pixel value to the other interpolation pixels $(a_i, a_j)$, $(a_i, a_{j+1})$, and $(a_i, a_{j+2})$ using the pixel values of pixels of the comparison target pattern at the corresponding positions.

In the most similar pattern searched for in this way, the pixel values of the pixels of the color image at the positions corresponding to the interpolation target pixels in the template are acquired. When only the most similar pattern is used, the pixel values acquired in this way can be used as the pixel values of the interpolation pixels. For example, when the color image is a RGB image, the R, G, and B component values of the candidate pixel values may be acquired from the R, G, and B plain images, respectively. Moreover, when a plurality of patterns selected in descending order of the degrees of coincidence are used, the pixel values acquired from the plurality of patterns may be synthesized to obtain the pixel values of the interpolation target pixels. As a method of synthesizing pixel values, there are a method of averaging the pixel values with a fixed weighting, and a method of calculating a weighted average by controlling weighting such that a large weighting is applied as the degree of coincidence of the similar pattern increases.

The template matching includes one-dimensional template matching and two-dimensional template matching. In the two-dimensional template matching, optional regions in the vicinity of an interpolation target pixel within an image, that is, region presented in the left and right sides or the upper and lower sides or in the oblique direction of the interpolation target pixel are cut as patterns, and the degree of coincidence between the pattern and the template is calculated to thereby search for the most similar pattern. In this embodiment, the template matching employed by the first pixel value generating unit 32 is two-dimensional template matching. In contrast, in one-dimensional template matching, patterns are cut from one line including the interpolation target pixel, and the most similar pattern is searched for. Since the two-dimensional template matching and the one-dimensional template matching are different interpolation methods, these interpolation methods can be employed in the second pixel value generating unit 33, the third pixel value generating unit, and the like which will be described later.

The second pixel value generating unit 33 generates the pixel value of the interpolation target pixel using a different interpolation method from that of the first pixel value generating unit 32. As the different interpolation method, an interpolating method can be used. The interpolating method includes nearest-neighbor interpolation (0-order interpolation), linear interpolation (1-order interpolation), parabolic interpolation (2-order interpolation), cubic interpolation (3-order interpolation), polynomial interpolation, spline interpolation, Lagrange interpolation, and the like. Moreover, bilinear interpolation, bicubic interpolation, and the like which expand linear interpolation or cubic interpolation two-dimensionally can also be used.

Meanwhile, the term "interpolation method" as used in this disclosure is intended to encompass: the "interpolating method" such as the nearest-neighbor interpolation, linear interpolation, parabolic interpolation, cubic interpolation, polynomial interpolation, spline interpolation, or Lagrange interpolation; the "pattern matching method" including template matching as describe above; and any other type of method for interpolating a pixel.

Figure 7A:
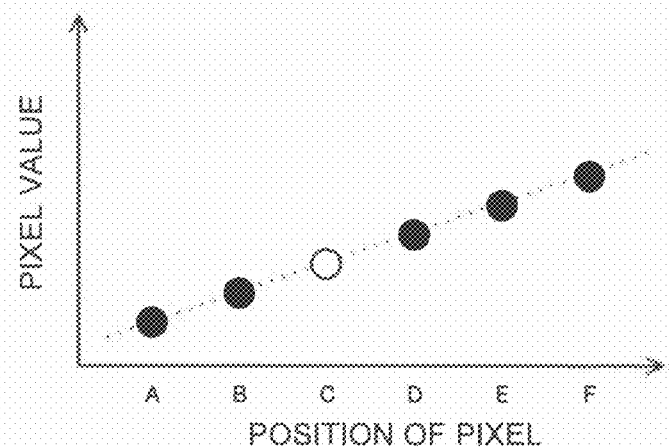
FIGS. 7A and 7B are diagrams illustrating an example of the relation between the position of a pixel and the pixel value thereof.

When there are pixels A to F arranged in that order on one line, and the pixel value of the pixel C is missing, the graph showing the relation between the position and the pixel value of that pixel is as illustrated in FIG. 7A. The actual pixel value of the pixel C is a value indicated by a white circle. In this case, since the pixel value increases by a certain value as the pixel position moves by one pixel, the relation between the position and the pixel value of the pixel can be expressed by a linear function. Thus, the pixel value of the pixel C which is to be inserted can be calculated using the obtained linear function (linear interpolation).

Figure 7B:
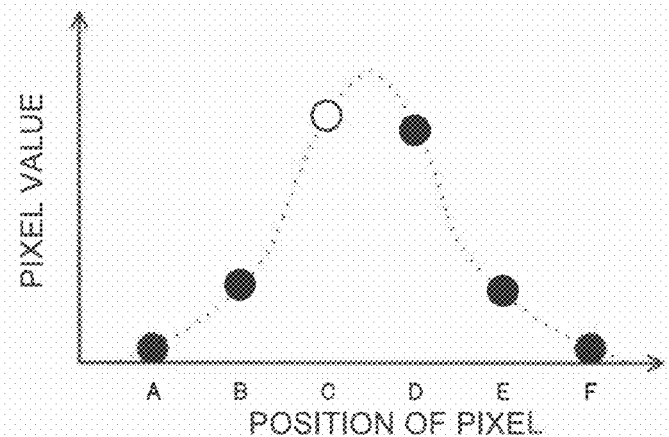

Moreover, when the relation is expressed by a curve as illustrated in FIG. 7B, the pixel value can be calculated by selecting an interpolation method most ideal to that curve. The parabolic interpolation can be selected when the relation can be expressed by a quadratic function, the cubic interpolation can be selected when the relation can be expressed by a cubic function, the polynomial interpolation or the Lagrange interpolation can be selected when the relation can be expressed by a polynomial expression, and the spline interpolation can be selected when the relation can be expressed by individual polynomial expressions.

In this example, the first pixel value generating unit 32 employs the pattern matching method, and the second pixel value generating unit 33 employs the interpolating method. Alternatively, the first pixel value generating unit 32 may employ the interpolating method, and the second pixel value generating unit 33 may employ the pattern matching method. Moreover, the pixel value generating units may employ the same pattern matching method but using two-dimensional template matching for one and one-dimensional template matching for the other. Similarly, the pixel value generating units may employ the same interpolating method but using linear interpolation for one and spline interpolation for the other.

The control unit 34 receives the data of plain images which are color-separated by the color separating unit 30 and are made up only of their respective color components, sends the data to the periodicity determining unit 31, receives the result of the determination by the periodicity determining unit 31, and determines which one of the first pixel value generating unit 32 and the second pixel value generating unit 33 to be used for generating the pixel values based on the determination result. When the periodicity determining unit 31 determines that the data have periodicity, the control unit 34 may employ the first pixel value generating unit 32 which uses the pattern matching method, and otherwise, the control unit 34 may employ the second pixel value generating unit 33 which uses the interpolating method. Moreover, the control unit 34 sends the image data to the determined one of the first pixel value generating unit 32 and the second pixel value generating unit 33, receives a plurality of pixel values generated by the determined pixel value generating unit as candidate pixel values, sends the candidate pixel values to the pixel value combining unit 35, obtains one combined pixel value obtained by combination, and sends the combined pixel value to the pixel value inserting unit 36 together with the data of the color image and the position information of the set pixel.

The periodicity determining unit 31, the first pixel value generating unit 32, the second pixel value generating unit 33, and the control unit 34 repeat the processes of determining the periodicity, determining the interpolation method, and generating candidate pixel values with respect to the respective plain images to thereby acquire candidate pixel values of the respective plain images.

The pixel value combining unit 35 combines the candidate pixel values corresponding to the number of plain images to thereby generate one combined pixel value. As the combination method that can be employed in this case, the following methods can be used.

As one exemplary method, weighted average can be used. The weighted average is a method of calculating the average by applying weighting to individual candidate pixel values. Specifically, the values (weight values) corresponding to weighting determined for the respective candidate pixel values are multiplied with the respective candidate pixel values, the sum of the multiplication results are calculated, and the sum is divided by the sum of weight values to thereby calculating a combined pixel value.

In the above example, although different weight values are employed for each candidate pixel value, the embodiment is not limited to this. The same weight values may be employed for all the candidate pixel values, or alternatively, the weight value of some candidate pixel values may be set to 0 and only specific candidate pixel values may be selectively employed.

As another method, a method of combining the color component values of candidate pixel values may be used. This method is to acquire the R, G, and B component values of the candidate pixel values obtained from the R, G, and B plain images of the red, green, and blue components of a processing target image, respectively, and reduce the respective R, G, and B component values as one RGB value. In this method, a gain or an offset may be applied to each of the R, G, and B component values to correct the values. The gain or the offset may be calculated, for example, by a method of determining the gain or the offset so that the respective candidate pixel values have the same brightness value.

Moreover, a method of combining the candidate pixel values using a combination expression may be used. This method is to combine the respective candidate pixel values using Expressions (4) to (10) below to reduce them to one pixel value. In Expressions (4) to (6) below, the combined pixel value of a pixel is represented as (r', g', b'), the R, G, and B component values are represented as r, g, and b, and the candidate pixel values of the R, G, and B plain images are represented as $(r_R, g_R, b_R)$, $(r_G, g_G, b_G)$, and $(r_B, g_B, b_B)$, respectively. Moreover, "$\alpha$" in Expressions (4) to (6) is the value calculated by Expression (10).

$$r' = \alpha \times r_R \quad (4)$$

$$g' = \alpha \times g_G \quad (5)$$

$$b' = \alpha \times b_B \quad (6)$$

$$r_T = r_R + r_G + r_B \quad (7)$$

$$g_T = g_R + g_G + g_B \quad (8)$$

$$b_T = b_R + b_G + b_B \quad (9)$$

$$\alpha = \frac{r_R + g_G + b_B}{r_T + g_T + b_T} \quad (10)$$

The pixel value inserting unit 36 inserts the combined pixel value calculated by the pixel value combining unit 35 into the interpolation target pixel set in advance. The pixel value inserting unit 36 sets the combined pixel value combined and calculated by the pixel value combining unit 35 to the interpolation target pixel, and when the combined pixel value has already been set, replaces the set combined pixel value with the combined pixel value to thereby insert the pixel value to the interpolation target pixel. In this way, the interpolation process for one interpolation target pixel is completed. When there is a plurality of interpolation target pixels, the processes in the respective units are repeated plural times corresponding to the number of interpolation target pixels.

When the pixel value inserting unit 36 inserts the combined pixel value, the following two methods can be used. One method is to insert the combined pixel value to the interpolation target pixel of the color image. That is, this method is to insert the combined pixel value to the position of the interpolation target pixel in the original color image. When it is desired to interpolate only the specific color component value, it is possible to interpolate only the specific color component value by replacing the color component value of the interpolation target pixel using the corresponding color component value of the combined pixel value.

The other method is to insert the color component value of the combined pixel value to the interpolation target pixel for each plain image. This method is to insert the corresponding color component value of the combined pixel value to the interpolation target pixel for each plain image to complete the interpolation process of the interpolation target pixel with respect to all the plain images and then to combine the plain images to obtain the original color image. As the value inserted to the plain image, the color component value of the combined pixel value corresponding to the plain image is used. For example, when the color image is a RGB image, the R, G, and B component values of the combined pixel values are set to the R, G, and B plain images to complete the interpolation process, and then, all the plain images of RGB are combined to obtain the original RGB color image. When the position of the interpolation target pixel is different for each plain image, the corresponding color component value of the combined pixel value is inserted to the plain image which is presently being interpolated, and the other component values of the combined pixel values are discarded.

The process in which these respective units perform the respective processes to generate the pixel value of the interpolation target pixel, the interpolation target pixel is interpolated with the pixel value will be described with reference to the focus lens illustrated in FIG. 8. When this process starts from step S800, first, in step S805, the color separating unit 30 separates a processing target image into color components designated in advance to generate plain images made up only of their respective color components. After that, in step S810, the pixel specifying unit detects an interpolation target pixel into which its pixel value will be inserted from one plain image to set the interpolation target pixel to be interpolated with the pixel value. This detection can be performed using the above-described method. When there is a plurality of interpolation target pixels, one pixel may be selected sequentially in the arrangement order based on the coordinate position at which the pixels are arranged, for example, and the selected pixel may be set as the interpolation target pixel.

In step S815, the periodicity determining unit 31 designates a region including the interpolation target pixel and determines whether a variation in the pixel values within the region has periodicity. The determination region is designated using the method of determining the size of the region and the method of determining periodicity, and the presence of periodicity is determined.

Subsequently, in step S820, an interpolation method used for the interpolation target pixel is determined. In this step, the control unit 34 determines one of the first pixel value generating unit 32 and the second pixel value generating unit 33 to be employed for generating the pixel value of the interpolation target pixel based on the determination result in step S815. As described above, when the periodicity determining unit 31 determines that periodicity is present, the pattern matching method is selected. When the periodicity determining unit 31 determines that periodicity is not present, the interpolating method is selected.

In step S825, it is determined whether the first pixel value generating unit 32 is employed. When the interpolation method selected in step S820 is the pattern matching method, it is determined that the first pixel value generating unit 32 performing the interpolation process using the pattern matching method is to be employed. On the other hand, when the interpolation method other than the pattern matching method, it is determined that the first pixel value generating unit 32 is not to be employed.

When the first pixel value generating unit 32 is determined to be employed in step S825, the flow proceeds to step S830. In step S830, a similar pattern is searched for by the pattern matching method used by the first pixel value generating unit 32, and the candidates of pixel values, namely candidate pixel values to be inserted to the interpolation target pixel are generated based on the similar pattern thus searched for. On the other hand, when the first pixel value generating unit 32 is determined not to be employed in step S825, the flow proceeds to step S835. In step S835, the candidate pixel values of the interpolation target pixel are generated by the interpolating method used by the second pixel value generating unit 33.

In step S840, it is determined whether the candidate pixel values to be inserted to the interpolation target pixel have been completely generated with respect to all the plain images. When the candidate pixel values have not been completely generated with respect to all the plain images, the flow returns to step S815, and the periodicity is determined with respect to the next plain image. On the other hand, when the candidate pixel values have been completely generated with respect to all the plain images, the flow proceeds to step S845, and the generated candidate pixel values are combined to calculate one combined pixel value to be inserted to the interpolation target pixel. As for the combination method, the candidate pixel values can be combined by the above-described method.

Subsequently, in step S850, the combined pixel value calculated in step S845 is inserted to the interpolation target pixel set in step S810. Since the interpolation target pixel does not have a pixel value or have an incorrect value if it has, a pixel value is set to the interpolation target pixel by inserting the generated pixel value into the interpolation target pixel. The insertion of the combined pixel value can be performed by any one of the two methods described above. Then, the flow proceeds to step S855, and it is determined whether all the interpolation target pixels have been completely interpolated. When a plurality of interpolation target pixels is detected in step S810, it is determined whether all the plurality of interpolation target pixels have been interpolated with the generated pixel values.

When it is determined in step S855 that all the interpolation target pixels have been completely interpolated, the flow proceeds to step S860, and this process ends. On the other hand, when it is determined that all the interpolation target pixels have not been completely interpolated, the flow returns to step S810. In step S810, a process of specifying the next interpolation target pixel, generating the candidate pixel values, combining the candidate pixel values to calculate a combined pixel value, and inserting the combined pixel value is performed.

In step S815, in order to determine the periodicity in the region including the interpolation target pixel, a process as illustrated in FIG. 9 may be executed. First, in step S900, the step of determining the periodicity starts. In step S905, a representative cycle is calculated using the pixel values of the respective pixels within the determination region. That is, the representative cycle necessary for calculating the degree of confidence as well as necessary for determining the size of the template and the region to be searched is calculated. Moreover, in step S910, the periodicity in the entire determination region is determined using the representative cycle.

Subsequently, in step S915, the determination region is divided into regions to the left and right sides of the interpolation target pixel, and the left and right regions are set. In this example, the periodicity determining unit 31 further includes a partial region periodicity determining unit, and the partial region periodicity determining unit divides the determination region into the left and right regions, sets these regions as the partial regions, and determines whether periodicity is present in the respective partial regions.

Thus, in step S920, the representative cycle in the region on the left side of the interpolation target pixel is calculated, and the periodicity is determined using the representative cycle. In step S925, the representative cycle in the region on the right side of the interpolation target pixel is calculated, and the periodicity is determined using the representative cycle. When these determination processes ends, the periodicity determination process of step S930 ends.

Figure 10A:
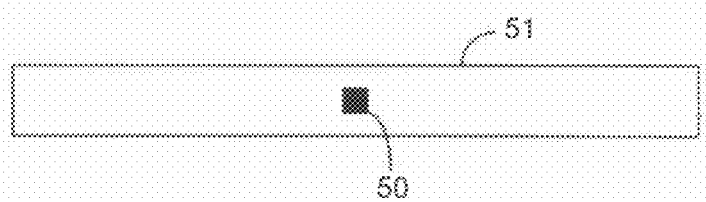
FIGS. 10A to 10C are diagrams illustrating a determination region used for determining the periodicity of a partial region.
Figure 10B:
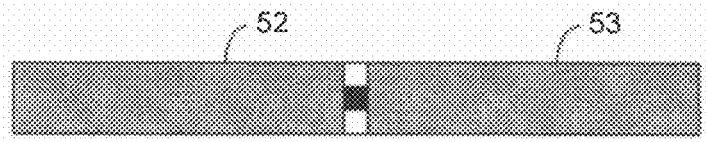
Figure 10C:
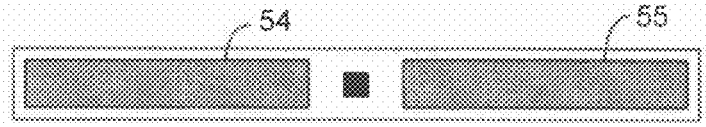

In steps S915 to S925, a determination region 51 is set so that an interpolation target pixel 50 is located at the center as illustrated in FIG. 10A, the determination region 51 is divided to have partial regions on the left and right sides of the interpolation target pixel 50 as illustrated in FIG. 10B. The region on the left side of the interpolation target pixel 50 is set as a partial region 52 for determining the periodicity of the left side, and a region on the right side of the interpolation target pixel 50 is set as a partial region 53 for determining the periodicity of the right side. In this way, the periodicity of the partial regions 52 and 53 can be determined.

As long as the presence of periodicity can be appropriately determined, it is not necessary to set, as the determination regions, the large partial regions 52 and 53 positioned on the left and right sides of the interpolation target pixel 50, which are obtained by excluding the interpolation target pixel 50 and the upper and lower pixels thereof from the determination region 51 as illustrated in FIG. 10B. Instead, smaller partial regions 54 and 55 as illustrated in FIG. 100 may be set. Moreover, the partial region needs not be located inside the determination region 51 but may be set so as to partially protrude out from the determination region 51.

In FIG. 10B, although the determination region 51 is set as a two-dimensional region having predetermined width and height of three pixels or more, the determination region 51 may be set as a one-dimensional region having the same height as the interpolation target pixel 50, namely one pixel, and having a width made up of a predetermined number of pixels.

As above, by determining the periodicity in the regions on the left and right sides of the interpolation target pixel and the periodicity in the entire determination region including the interpolation target pixel, it is possible to determine the periodicity in the region including the interpolation target pixel. That is, if the entire region has periodicity, it can be said that the region including the interpolation target pixel has periodicity, and the region including the interpolation target pixel can be determined as a region having periodicity.

In the determination performed in steps S910, S920, and S925, the process illustrated in FIG. 11 is performed in order to determine the presence of the respective periodicities. First, in step S1100, when the respective steps (steps S910, S920, and S925) are executed, the processes are started. In step S1105, the maximum frequency of the distance between peaks at which the pixel value within the determination region reaches its local maximum is calculated in the above-described manner, and the maximum frequency is calculated as the representative cycle of the pixel values. Since the representative cycle in the entire determination region is calculated in step S910, the representative cycle calculated in that step can be employed, and the description thereof will not be described.

Subsequently, in step S1110, the degree of confidence is calculated using the representative cycle calculated in the previous steps. The degree of confidence can be calculated using Expression (3) described above. In step S1115, it is determined whether the calculated degree of confidence exceeds a threshold value, whereby the presence of periodicity is determined, and this process ends in step S1120. When the degree of confidence exceeds the threshold value, it is determined that the periodicity is present. When the degree of confidence is equal to or smaller than the threshold value, it is determined that the periodicity is not present.

In the flow of the processes illustrated in FIG. 9, after estimating the representative cycle, the periodicity in the entire determination region is determined. Subsequently, the periodicity in the left partial region is determined, and subsequently thereto, the periodicity in the right partial region is determined, whereby the periodicity in the region including the interpolation target pixel is determined. However, the embodiment is not limited to this. For example, after determining the periodicity in the left and right partial regions, the periodicity in the entire determination region may be determined. Alternatively, when it is determined that the periodicity is present in the left and right partial regions, the cycles thereof may be employed as the representative cycle, and it is determined that periodicity is present in the entire determination region. On the other hand, when it is determined that periodicity is not present in both the left and right partial regions, it is determined that periodicity is not present in the entire determination region.

Thus, if it is determined that periodicity is present in at least one of the left and right partial regions, it is determined that periodicity is present. On the other hand, if it is determined that periodicity is not present in both partial regions, it is determined that periodicity is not present in the entire determination region. This is because, if it is determined that periodicity is present in at least one of the left and right partial regions, it is highly likely that periodicity is present in the region including the interpolation target pixel. Thus, interpolation can be performed with higher accuracy when the interpolation process is performed by employing the interpolation method used when it is determined that periodicity is present in the determination region.

In step S830 illustrated in FIG. 8, when the first pixel value generating unit 32 generates the pixel value of an interpolation target pixel by the template matching, the first pixel value generating unit 32 executes the process illustrated in FIG. 12. First, in step S1200, this process starts, and the size of the template is determined in step S1205. The size can be determined with reference to the representative cycle as described above.

Subsequently, in step S1210, based on the size of the template thus determined, a region having the size including the interpolation target pixel is cut, and the cut region is generated as a base pattern. In step S1215, a region to be searched to retrieve a similar pattern is determined and set based on the representative cycle. The region to be searched can be determined and set as described above. Moreover, in step S1220, the generated base pattern is used as the template, and a similar pattern is calculated and searched for from the set region to be searched. The searching of a similar pattern can be performed by calculating the degrees of coincidence with the template and selecting a pattern having the highest degree of coincidence.

In step S1225, the similar pattern thus searched for and the template used for searching for the similar pattern are compared with each other, and the pixel value of a pixel within the similar pattern at the position corresponding to the position of the interpolation target pixel within the template is acquired as the candidate pixel value to be inserted to the interpolation target pixel. When the candidate pixel value is acquired, the flow proceeds to step S1230, and the process ends.

Next, a second embodiment of the image processing apparatus according to the present invention will be described. The image processing apparatus has the same configuration as that illustrated in FIG. 2, and the flow of the overall process is the same as that of the flowchart illustrated in FIG. 8. Thus, the description thereof will not be provided herein, and only the details of the process performed in step S845 illustrated in FIG. 8 will be described in detail with reference to FIG. 13.

The process illustrated in FIG. 13 starts from step S1300 in response to the start of the process of step S845 illustrated in FIG. 8. In step S1305, the pixel value combining unit 35 determines whether the generated candidate pixel values are suitable for combination.

As an example of the criterion for determining whether the candidate pixel values are suitable for combination, it can be determined by determining which one of the pixel value generating units has generated the candidate pixel values. Specifically, when a criterion that only the candidate pixel values generated by the first pixel value generating unit 32 should be used is set, and the obtained candidate pixel values are generated by the first pixel value generating unit 32, the candidate pixel values are determined to be suitable, and otherwise, the candidate pixel values are determined not to be suitable. On the other hand, when a criterion that only the candidate pixel values generated by the second pixel value generating unit 33 should be used is set, and the obtained candidate pixel values are generated by the second pixel value generating unit 33, the candidate pixel values are determined to be suitable, and otherwise, the candidate pixel values are determined not to be suitable.

This is because when the first pixel value generating unit 32 generates candidate pixel values using the pattern matching method, the second pixel value generating unit 33 generates candidate pixel values by the interpolating method, and combination is performed under a condition where the candidate pixel values generated by the respective pixel value generating units coexist, high-frequency components which can be reproduced with high accuracy if all the periodic regions were reproduced using the results based on the pattern matching method are not reproduced with high accuracy due to the coexistence of the results based on the interpolating method having lower accuracy. As a result, the interpolation accuracy decreases. In this case, by setting a determination criterion such that the candidate pixel values generated by the first pixel value generating unit 32 are employed preferentially, it is possible to solve the problem associated with a decrease in interpolation accuracy.

Subsequently, in step S1310, it is determined whether there is a candidate pixel value suitable for combination. This can be determined based on the determination result in step S1305. When there is a suitable candidate pixel value, the flow proceeds to step S1315, and a candidate pixel value which is not suitable for combination is replaced with the candidate pixel value generated by another interpolation method. In step S1320, the candidate pixel value(s) suitable for combination and the replaced candidate pixel value(s) are combined by the above combination method to thereby generate one combined pixel value.

Specifically, when the candidate pixel values generated by the first pixel value generating unit 32 are determined to be candidate pixel values suitable for combination, and a part of the candidate pixel values are generated by the second pixel value generating unit 33, since there is a suitable candidate pixel value, the flow proceeds to step S1315. Then, the candidate pixel value which is not suitable and generated by the second pixel value generating unit 33 is replaced with the candidate pixel value generated by the first pixel value generating unit 32, and the candidate pixel values are combined in step S1320.

When there is no suitable candidate pixel value, since any of the candidate pixel values is generated by the second pixel value generating unit 33, the flow proceeds to step S1325. Then, the candidate pixel values are averaged to generate one combined pixel value. In this way, when the combined pixel value is generated in step S1320 or S1325, the flow proceeds to step S1330, and the process ends.

In this example, although the candidate pixel values are averaged in step S1325 to generate one combined pixel value, one of the candidate pixel values may be selected as a representative value, and the representative value may be used as the combined pixel value. By generating only the candidate pixel values suitable for combination without generating candidate pixel values which are not suitable for combination, it is possible to eliminate the processes of steps S1305 to S1315 and step S1325.

Next, a third embodiment of the image processing apparatus will be described. The image processing apparatus has the same configuration as that illustrated in FIG. 2, and the flow of the overall process is the same as that of the flowchart illustrated in FIG. 8. Thus, the description thereof will not be provided herein, and only the details of the process performed in step S845 illustrated in FIG. 8 will be described in detail with reference to FIG. 14.

The process illustrated in FIG. 14 starts from step S1400 in response to the start of the process of step S845 illustrated in FIG. 8. In step S1405, a combination method, which remains untested with respect to the suitability of pixel values generated as a result of use of the combination method, is selected from predetermined combination methods. As the combination methods, the above-mentioned methods can be used.

In step S1410, the candidate pixel values are combined using the selected method to generate one pixel value. Subsequently, in step S1415, it is determined whether the generated pixel value is suitable for interpolation. As the determination method, a determination method which uses template matching may be used.

The determination method is approximately the same as the flow of processes according to the template matching method described above. First, the size of a template is determined. Subsequently, the template is generated, and a region to be searched is determined. Then, the degrees of coincidence with the template at the respective positions within the determined region to be searched are calculated, and the position having the highest degree of coincidence is selected as the similar pattern.

Since the processing target image is a color image, it is necessary to calculate the degrees of coincidence between pixels made up of a plurality of color components. As an example of this calculation, a method which uses the distance between two pixel values in a specific color space such as a color-difference space may be used. Specifically, in the case of a Lab color space, the distance can be calculated by calculating the squares of the differences between the respective values of L, a, and b, adding the squares, and finding the square root of the addition result. The degree of coincidence increases as the distance decreases, and the degree of coincidence decreases as the distance increases.

In addition to the above method, a method which uses plain images separated for each color component may be used. When using plain images, the degrees of coincidence are calculated from the distance between two pixel values and synthesizing the degrees of coincidence to thereby obtain a final degree of coincidence. As a method of synthesizing the degrees of coincidence, a method of calculating the weighted average described above, a method of employing the highest or lowest degree of coincidence, and the like can be used.

After calculating the degree of coincidence with respect to the combination method of candidate pixel values selected in this way, it is determined in step S1420 whether suitability has been determined with respect to all the combination methods. When there is a candidate pixel value combination method of which the suitability has not been determined, the flow returns to step S1405, and the processes of steps S1405 to S1420 are repeated for the remaining combination methods. Rather than determining the suitability for all the combination methods, a threshold value of the degree of coincidence may be set, and the processes of steps S1405 to S1420 may be skipped when a combination method having a sufficient level of suitability such that the degree of coincidence thereof is equal to or higher than the threshold value is detected.

When it is determined in step S1420 that suitability has been determined for all the combination methods, the flow proceeds to step S1425. In step S1425, a combined pixel value obtained by a combination method having the highest degree of coincidence among the calculated degrees of coincidence is determined to be the pixel value to be inserted to the interpolation target pixel. Then, the pixel value combining unit 35 outputs the pixel value to the control unit 34, and the process ends in step S1430.

After the process ends, the flow proceeds to step S850 in FIG. 8, and the pixel value inserting unit 36 inserts the combined pixel value output by the control unit 34 to the interpolation target pixel set in step S810. In step S855, it is determined whether all the interpolation target pixels have been completely interpolated. When it is determined that all the interpolation pixels have been completely interpolated, the flow proceeds to step S860, and the interpolation process for the processing target image ends.

Next, a fourth embodiment according to the image processing apparatus will be described. The image processing apparatus has the same configuration as that illustrated in FIG. 2, and the flow of the overall process is the same as that of the flowchart illustrated in FIG. 8. Thus, the description thereof will not be provided herein, and only the details of the process performed in step S845 illustrated in FIG. 8 will be described in detail with reference to FIG. 15.

The process illustrated in FIG. 15 starts from step S1500 in response to the start of the process of step S845 illustrated in FIG. 8. In step S1505, a method which does not determine the suitability of pixel values generated by combination is selected from predetermined combination methods similarly to the embodiment illustrated in FIG. 14. As the combination methods, the above-mentioned methods may be used.

In step S1510, a combination of candidate pixel values is selected. That is, a predetermined number of candidate pixel values are selected from the candidate pixel values that are present corresponding to the number of plain images, and a set of the selected candidate pixel values is created. The number of candidate pixel values may be any number if it is equal to or larger than 1 and equal to or smaller than the total pixel count. However, if there is a limitation in the number of candidate pixel values depending on the combination method, the number of candidate pixel values needs to be determined by the limitation.

For example, when an image is separated into four colors to generate four plain images, since one candidate pixel value is generated from a similar pattern having the highest degree of coincidence for each of the plain images, four candidate pixel values are generated for one interpolation target pixel. As an example of creating combinations, two candidate pixel values are selected and combined from the four candidate pixel values based on a predetermined number (in this example, two) of candidate pixel values to be combined. When the same pairs are created, one of them is discarded in order to prevent redundancy, and finally, six sets of candidate pixel value pairs are created.

Subsequently, in step S1515, one of the created sets of candidate pixel values is selected, and the candidate pixel values constituting the set are combined to calculate one combined pixel value. In step S1520, it is determined whether the calculated combined pixel value is suitable for interpolation. As the determination method, a determination method which uses template matching may be used.

In step S1525, it is determined whether the suitability has been determined with respect to all the sets. When there is a set of which the suitability has not been determined, the flow returns to step S1510, and another set is selected, and the processes of combining and determining suitability are repeated. In this case, rather than determining the suitability for all the sets, a threshold value of the degree of coincidence may be set, and the processes of steps S1510 to S1525 may be skipped when a set having a sufficient level of suitability such that the degree of coincidence thereof is equal to or higher than the threshold value is detected.

When it is determined in step S1525 that suitability has been determined for all the sets, the flow proceeds to step S1530, and it is determined whether suitability has been determined for all the combination methods. When there is a combination method of which the suitability has not been determined, the flow returns to step S1505, another combination method is selected, and the processes of steps S1510 to S1525 are repeated. In this case, rather than determining the suitability for all the combination methods, a threshold value of the degree of coincidence may be set, and the processes of steps S1505 to S1530 may be skipped when a combination method having a sufficient level of suitability such that the degree of coincidence thereof is equal to or higher than the threshold value is detected.

When it is determined that suitability has been determined for all the combination methods, the flow proceeds to step S1535. In step S1535, a combined pixel value obtained by a combination method having the highest degree of coincidence among the calculated degrees of coincidence is determined to be the pixel value to be inserted to the interpolation target pixel. Then, the pixel value combining unit 35 outputs the pixel value to the control unit 34, and the process ends in step S1540.

After the process ends, the flow proceeds to step S850 in FIG. 8, and the pixel value inserting unit 36 inserts the combined pixel value output by the control unit 34 to the interpolation target pixel set in step S810. In step S855, it is determined whether all the interpolation pixels have been completely interpolated. When it is determined that all the interpolation pixels have been completely interpolated, the flow proceeds to step S860, and the interpolation process for the processing target image ends.

FIG. 16 is a functional block diagram illustrating a fifth embodiment of the image processing apparatus. In this embodiment, the image processing apparatus includes a color separating unit 60, a periodicity determining unit 61, a first pixel value generating unit 62, a second pixel value generating unit 63, a control unit 64, a pixel value combining unit 65, and a pixel value inserting unit 66 which are the same as those of the first embodiment illustrated in FIG. 2. In addition, the image processing apparatus includes a boundary determining unit 67, a validity verification unit 68, and a third pixel value generating unit 69.

Since the processes performed by the color separating unit 60, the periodicity determining unit 61, the first pixel value generating unit 62, the second pixel value generating unit 63, the control unit 64, the pixel value combining unit 65, and the pixel value inserting unit 66 are the same as those of the first embodiment, the description thereof will not be provided herein. Thus, the boundary determining unit 67, the validity verification unit 68, and the third pixel value generating unit 69 will be described.

The boundary determining unit 67 determines whether an interpolation target pixel actually belongs to a periodic region when the periodicity determining unit 61 determines that an image region including the interpolation target pixel is a region (periodic region) in which pixel values vary periodically. The interpolation target pixel is present either within a periodic region or a non-periodic region, and the pixel value of the interpolation target pixel can be estimated from the pixel values of pixels present in the vicinity of the interpolation target pixel within the same region. This is because a pattern made up of several continuous pixels including the interpolation target pixel is similar to patterns present in the vicinity thereof, the pattern can be estimated from the patterns present in the vicinity thereof.

However, when the interpolation target pixel is present in the vicinity of the boundary between a periodic region and a non-periodic region, if the interpolation target pixel is located within the periodic region whereas patterns, which are present in the vicinity thereof and are located in the non-periodic region, are employed, it is difficult to perform interpolation properly. Thus, the boundary determining unit 67 determines the region to which the interpolation target pixel actually belongs so that the pixel value can be estimated using the proper patterns located in the periodic region.

As an example thereof, reference regions are set at positions around the interpolation target pixel so as to be separated by a predetermined distance to the left and right sides of the interpolation target pixel, and the variance of the pixel value, which is one of the image characteristics, of the reference regions set to the left and right sides of the interpolation target pixel is individually calculated. When the variance in both the left and right reference regions is equal to or larger than a threshold value, the interpolation target pixel can be determined to be in the periodic region. When the variance is smaller than the threshold value, the interpolation target pixel can be determined to be in the non-periodic region.

The predetermined distance may be 3 pixels, for example. This is because when halftone dots are arranged at intervals of 6 pixels, for example, a template made up of three pixels on the left and right sides of an interpolation pixel is used in the pattern matching described later. Thus, the reference regions are set at the positions separated from the interpolation target pixel by 3 pixels on the left and right sides of the interpolation target pixel, which are the closest positions on the outer side of the template. The reason why the reference regions are set at those closest positions is because most patterns similar to the template are present in the vicinity of the template. The distance is not limited to 3 pixels, but any distance may be used if determination can be made appropriately.

The reference region may be a region having a height of 1 pixel including the interpolation target pixel, for example, namely one line of the image. Alternatively, the reference region may be a rectangular region having an optional height including the interpolation target pixel similarly to the determination region described above. This region may be set by the user in advance and may be dynamically set by the device similarly to the case of the determination region. The reference region is not limited to being located on the left and right sides of the interpolation target pixel, but one or more regions may be set, for example, on the upper and lower sides or the upper, lower, left, and right sides of the interpolation target pixel.

The variance can be calculated by Expression (11) below. In Expression (11), "$x_i$" is the pixel value of the i-th pixel in the reference region, "$x_m$" is the average value of the pixel values of the pixels in the reference region, and "n" is the number of pixels present in the reference region. The variance can be replaced with the difference between the maximum luminance value and the minimum luminance value of the pixels in the reference region, or in the case of color images, the difference between the maximum green component value (G component value) and the minimum G component value.

$$\sigma^2 = \frac{1}{n}\sum_{i=1}^{n}(x_i - x_m)^2 \qquad (11)$$

The control unit 64 determines an interpolation method based on the result of the determination by the boundary determining unit 67 as well as the result of the periodicity determination by the periodicity determining unit 61, determines which one of the first, second, and third pixel value generating units 62, 63, and 69 is to be employed, and causes the determined pixel value generating unit to generate a pixel value to be inserted to the interpolation target pixel. However, this may be realized by a parallel process such that the pixel values of the interpolation target pixel are generated in advance by all of the first, second, and third pixel value generating units 62, 63, and 69, and the control unit 64 selects one of the respective pixel values. The third pixel value generating unit 69 generates candidate pixel values by an interpolation method different from the interpolation methods employed by the first and second pixel value generating units 62 and 63.

The validity verification unit 68 verifies the validity of the candidate pixel values generated by the first, second, and third pixel value generating units 62, 63, and 69. When it is verified that the candidate pixel value generated by one pixel value generating unit is not valid, another pixel value generating unit is caused to generate a candidate pixel value. Then, the validity verification unit 68 verifies the validity of the candidate pixel value again.

For example, verification of the validity of the candidate pixel value generated by the first pixel value generating unit 62 can be performed using related information obtained when the first pixel value generating unit 62 generates a pixel value. As the related information, when the first pixel value generating unit 62 uses a pattern matching method as the interpolation method, the degree of dissimilarity or the degree of similarity between the template and a comparison target pattern can be used. In this case, as the template, a template excluding the interpolation target pixel may be used, and a template in which the generated pixel value is inserted may be used. As the degree of dissimilarity or the degree of similarity, SAD, SSD, a correlation coefficient, covariance, and the like described above can be used.

The validity verification unit 68 can determine whether the candidate pixel value is valid by determining whether the degree of dissimilarity is smaller than a threshold value or the degree of similarity is equal to or larger than the threshold value. The candidate pixel value is determined to be valid when the degree of dissimilarity is smaller than the threshold value or the degree of similarity is equal to or larger than the threshold value.

Thus, the validity verification unit 68 may perform threshold processing on the degree of dissimilarity or the degree of similarity, and a condition in which the degree of dissimilarity is smaller than the threshold value, or the degree of similarity is equal to or larger than the threshold value may be used as the condition for determining the validity. This threshold value may be set by the user in advance, and may be determined dynamically by the device, similarly to the above-described threshold value and the like.

In conjunction with this, the control unit 64 causes the validity verification unit 68 to verify whether the candidate pixel value generated when the first pixel value generating unit 62 is employed is valid. When the candidate pixel value is determined not to be valid, the control unit 64 causes the third pixel value generating unit 69 to generate a candidate pixel value. When this candidate pixel value is also determined not to be valid, the control unit 64 causes the second pixel value generating unit 63 to generate a candidate pixel value. However, the embodiment is not limited to this, and this may be realized by a parallel process such that the candidate pixel values are generated in advance by all of the first, second, and third pixel value generating units 62, 63, and 69, and the control unit 64 selects one of the respective candidate pixel values based on the result of the verification by the validity verification unit 68.

Figure 17:
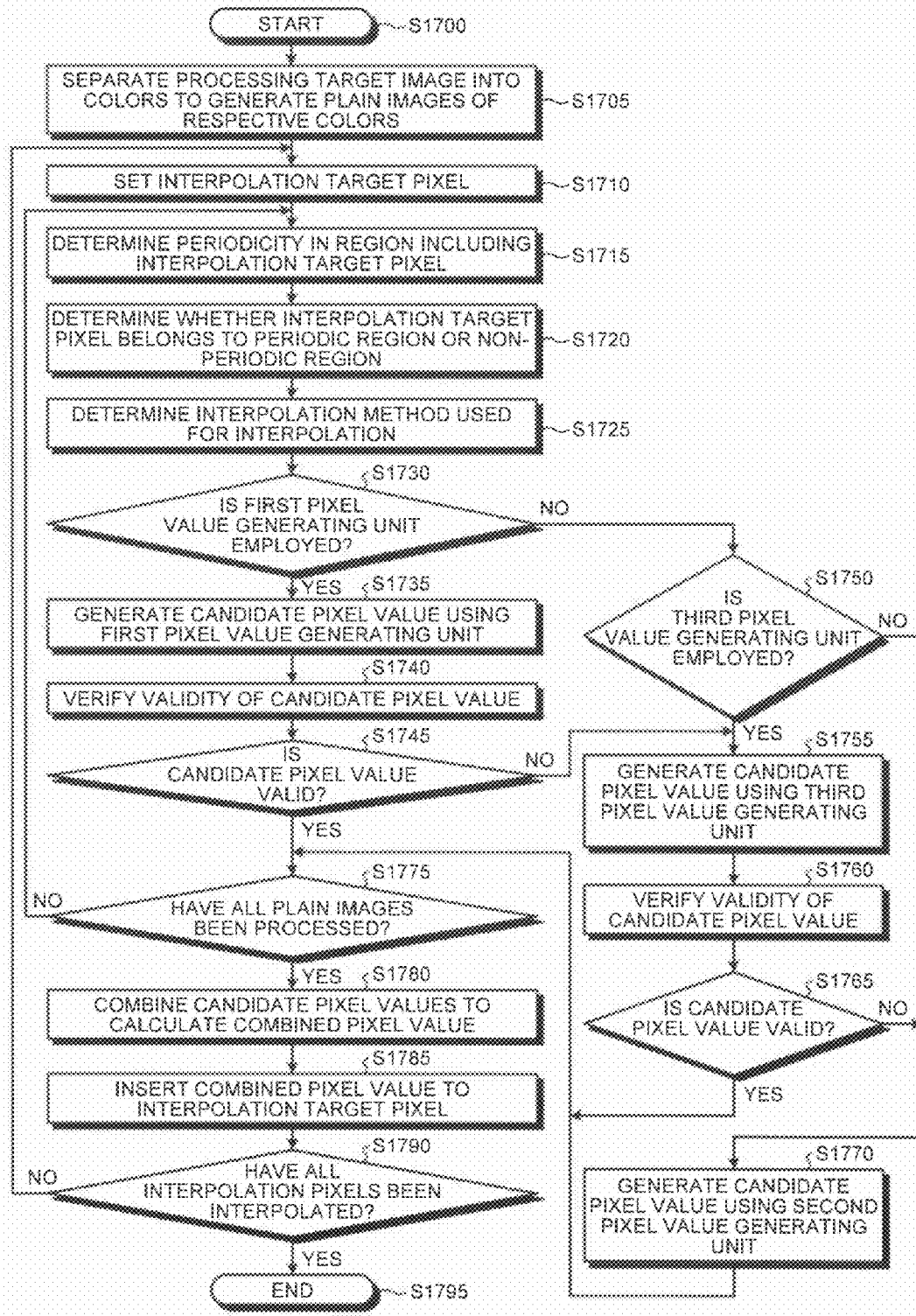
FIG. 17 is a flowchart illustrating the flow of a pixel interpolation process executed by the image processing apparatus illustrated in FIG. 16.

The process of correcting the pixel value of the interpolation target pixel using the image processing apparatus illustrated in FIG. 16 will be described with reference to the flowchart illustrated in FIG. 17. This process starts from step S1700. First, in step S1705, the color separating unit 60 separates a processing target image into color components designated in advance, and generates plain images which are images of the respective colors made up only of the respective color components. After that, in step S1710, the pixel specifying unit selects one plain image, detects, from the plain image, a pixel whose pixel value is to be inserted and sets the pixel as an interpolation target pixel. This detection may be performed using the above-described method. When there is a plurality of interpolation target pixels, one pixel may be selected sequentially in the arrangement order based on the coordinate position at which the pixels are arranged, for example, and the selected pixel may be set as the interpolation target pixel.

In step S1715, the periodicity determining unit 61 designates a region including the interpolation target pixel and determines whether a variation in the pixel values within a region including the interpolation target pixel has periodicity. The determination region is designated using the method of determining the size of the region and the method of determining periodicity, and the presence of periodicity is determined. Subsequently, in step S1720, the boundary determining unit 67 determines whether the interpolation target pixel is actually present in a periodic region or a non-periodic region. In this determination, the boundary determination method and the method of determining the reference region size are employed. The determination is performed by calculating the variance of the pixel values individually in the left and right reference regions and determining whether the calculated variances of both the left and right reference regions are equal to or larger than the threshold value. When the variances are equal to or larger than the threshold value, the interpolation target pixel is determined to be present in the periodic region.

Subsequently, in step S1725, an interpolation method to be used for the interpolation target pixel is determined. In this step, the control unit 64 determines which one of the interpolation methods employed by the first, second and third pixel value generating units 62, 63, and 69 will be employed for generating the candidate pixel value based on the determination results in steps S1715 and S1720.

For example, when periodicity is present in the region including the interpolation target pixel, and the interpolation target pixel is present in the periodic region, the template matching method employed by the first pixel value generating unit 62 is used. When periodicity is present in the region including the interpolation target pixel, but the interpolation target pixel is present in the non-periodic region, the interpolating method employed by the second pixel value generating unit 63 is used. When periodicity is not present in the region including the interpolation pixel target, and the interpolation target pixel is present in the non-periodic region, the other interpolation method employed by the third pixel value generating unit 69 is used.

In addition to this, when the cycle of the region including the interpolation target pixel is short, and the interpolation target pixel is within the periodic region, the template matching method may be used. When the cycle in the region including the interpolation target pixel is short, and the interpolation target pixel is within the non-periodic region, the interpolating method may be used. In other cases, the interpolation method employed by the third pixel value generating unit 69 may be used.

The interpolation method employed by the third pixel value generating unit 69 may be any interpolation method if it is different from the interpolation methods employed by the first and second pixel value generating units 62 and 63. For example, when the first pixel value generating unit 62 employs a template matching method, and the second pixel value generating unit 63 employs cubic interpolation, the third pixel value generating unit 69 may employ the other interpolation methods such as one-dimensional template matching, nearest-neighbor interpolation, linear interpolation, parabolic interpolation, polynomial interpolation, spline interpolation, Lagrange interpolation, bilinear interpolation, bicubic interpolation, or the like.

Subsequently, in step S1730, it is determined whether the first pixel value generating unit 62 will be employed based on the determined interpolation method. When it is determined in step S1730 that the first pixel value generating unit 62 is employed, the flow proceeds to step S1735, the candidate pixel values are generated with respect to the plain images of the respective colors by the interpolation method used by the first pixel value generating unit 62. Subsequently, in step S1740, the validity verification unit 68 verifies the validity of the candidate pixel value based on the related information obtained when the first pixel value generating unit 62 generates the candidate pixel value. In step S1745, the validity of the candidate pixel value is determined.

When it is determined in step S1730 that the first pixel value generating unit 62 is not employed, the flow proceeds to step S1750, and it is determined whether the third pixel value generating unit 69 is employed. When it is determined that the third pixel value generating unit 69 is employed, and it is determined in step S1745 that the candidate pixel value is not valid, the flow proceeds to step S1755, and the candidate pixel value is generated by the interpolation method used by the third pixel value generating unit 69. Subsequently, in step S1760, the validity verification unit 68 verifies the validity of the candidate pixel value based on the related information obtained when the third pixel value generating unit 69 generates the candidate pixel value. In step S1765, the validity of the candidate pixel value is determined.

When it is determined in step S1750 that the third pixel value generating unit 69 is not employed, the flow proceeds to step S1770, and the candidate pixel value is generated by the interpolation method used by the second pixel value generating unit 63. Moreover, when it is determined in step S1765 that the candidate pixel value is not valid, the flow proceeds to step S1770, and the candidate pixel value is generated by the interpolation method used by the second pixel value generating unit 63.

When the candidate pixel value is determined to be valid in step S1745 or S1765, and after the candidate pixel value is generated in step S1770, the flow proceeds to step S1775, and it is determined whether the candidate pixel values to be inserted to the interpolation pixel have been completely generated with respect to all the plain images. When the candidate pixel values have not been completely generated for all the plain images, the flow returns to step S1715, and the periodicity of the next plain image is determined. On the other hand, when it is determined that the candidate pixel values have been completely generated for all the plain images, the flow proceeds to step S1780, and the generated candidate pixel values are combined to calculate one combined pixel value to be inserted to the interpolation target pixel. As for the combination method, the candidate pixel values can be combined by the above-described method.

Subsequently, in step S1785, the combined pixel value is inserted to the interpolation target pixel set in step S1710. The insertion of the combined pixel value can be performed by any one of the two methods described above. Then, the flow proceeds to step S1790, and it is determined whether all the interpolation pixels have been completely interpolated. When a plurality of interpolation pixels is detected in step S1710, it is determined whether the generated pixel value is inserted to all the plurality of interpolation target pixels.

When it is determined in step S1790 that all the interpolation target pixels have been completely interpolated, the flow proceeds to step S1795, and this process ends. On the other hand, when it is determined that all the interpolation target pixels have not been completely interpolated, the flow returns to step S1710. In step S1710, a process of setting the interpolation target pixel, generating the candidate pixel values, combining the candidate pixel values to calculate a combined pixel value, and inserting the combined pixel value is performed again.

In the fifth embodiment, the image processing apparatus is configured to include the boundary determining unit 67, the validity verification unit 68, and the third pixel value generating unit 69 in addition to the color separating unit 60, the periodicity determining unit 61, the first pixel value generating unit 62, the second pixel value generating unit 63, the control unit 64, the pixel value combining unit 65, and the pixel value inserting unit 66. However, in the embodiment, the image processing apparatus may be configured to further include only the boundary determining unit 67, only the third pixel value generating unit 69, only the boundary determining unit 67 and the validity verification unit 68, only the boundary determining unit 67 and the third pixel value generating unit 69, or only the validity verification unit 68 and the third pixel value generating unit 69.

In addition to the image processing apparatus and an image inspection method executed by the image processing apparatus, the present invention can provide a computer-readable program for realizing the method. The program may be stored in a recording medium such as an FD, a CD, a DVD, an SD card, a USB memory, or the like and provided as a recording medium having the program recorded therein.

As described above, the image processing apparatus includes the color separating unit and the pixel value combining unit and generates the candidate pixel value of the interpolation target pixel for each color to thereby obtain a combined pixel value as the pixel value to be inserted to the interpolation target pixel. In this way, it is possible to reproduce halftone dots of the individual colors in the color image. Moreover, the apparatus includes the periodicity determining unit and the control unit and switches the interpolation method depending on the presence of periodicity. In this way, it is possible to perform the interpolation process with high accuracy with respect to an image of which the pixel value changes abruptly.

Moreover, as described above, the pattern matching method may be used as the first interpolation method, and the interpolating method which is a different method from the first interpolation method may be used as the second interpolation method. By determining whether the candidate pixel value is suitable for the combination, when the candidate pixel value generated by the pattern matching method as the first interpolation method and the candidate pixel value generated by the interpolating technique as the second interpolation method are combined in a coexisting state, high-frequency components reproduced by the pattern matching method are prevented from being lost by being mixed with the values reproduced by the interpolating technique.

Moreover, the pixel value combining unit calculates a plurality of combined pixel values with respect to the interpolation target pixel using a plurality of combination methods, calculates the degree of coincidence between a base pattern having a predetermined size, which is interpolated by inserting the combined pixel value thereto and at least one reference pattern which is set to a position in the vicinity of the interpolation target pixel and has the same size as the base pattern, and determine whether the respective combined pixel values are suitable for interpolating the interpolation target pixel based on the calculated degree of coincidence. In this way, a combined pixel value set to the base pattern having the highest degree of coincidence can be determined as the combined pixel value to be inserted to the interpolation pixel.

Moreover, as described above, the pixel value combining unit creates a plurality of sets of candidate pixel values, combines the candidate pixel values included in the sets to calculate a plurality of combined pixel values, and creates a plurality of base patterns using the plurality of combined pixel values. The degree of coincidence between the base patterns and at least one reference pattern which is set to the position in the vicinity of the interpolation pixel and similar to the base pattern may be calculated, and a combined pixel value set to a base pattern having the highest degree of coincidence may be selected as a combined pixel value to be inserted to the interpolation pixel.

The periodicity determining unit determines whether the image region including the interpolation pixel is a periodic region. However, there is a case in which the image region is a periodic region when seen from a large range like one line of the image but is not a periodic region when seen from a narrow range in the vicinity of the interpolation target pixel. In such a case, the image region is erroneously determined to be a periodic region by the determination criterion. For example, a non-halftone dot region in the vicinity of a halftone dot region or a non-halftone dot region sandwiched between two halftone dot regions is likely to be subject to a detection error. When a detection error occurs, a flat region on the outer side of a halftone dot region may be interpolated as a halftone dot region, and an incorrect pixel value appears as the result of interpolation. Thus, in at least one embodiment, the apparatus further includes a boundary determining unit configured to set at least one reference region in the vicinity of the interpolation target pixel when the image region is determined to be a periodic region and determine whether the interpolation pixel is present in the periodic region or the non-periodic region based on the image characteristics of the at least one reference region.

In this case, the control unit determines which one of the first and second pixel value generating units will be used for generating the pixel value based on the determination result obtained by the boundary determining unit in addition to the determination result obtained by the periodicity determining unit.

As described above, in order to increase the interpolation accuracy, it is preferable to verify the validity of the generated candidate pixel value. Thus, in at least one embodiment, the apparatus further includes a validity verification unit for performing the verification. The validity verification unit determines the validity of the candidate pixel value based on related information obtained when the first pixel value generating unit generates the candidate pixel value. In this case, when the candidate pixel value is determined not to be valid, the control unit causes the second pixel value generating unit instead of the first pixel value generating unit to generate the pixel value.

Moreover, as described above, in order to further increase the interpolation accuracy, the apparatus further includes a third pixel value generating unit configured to generate the pixel value of the interpolation pixel using a third interpolation method different from the first and second interpolation methods. In this case, the validity verification unit determines the validity of the candidate pixel value based on related information obtained when the first pixel value generating unit generates the candidate pixel value. When the candidate pixel value is determined not to be valid, the control unit causes the third pixel value generating unit instead of the first pixel value generating unit to generate the pixel value. Moreover, the validity verification unit determines the validity of the candidate pixel value based on related information obtained when the third pixel value generating unit generates the candidate pixel value. When the candidate pixel value is determined not to be valid, the control unit causes the second pixel value generating unit instead of the third pixel value generating unit to generate the pixel value.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a color separating unit configured to separate a color image into a plurality of color components to generate images of respective colors;
a periodicity determining unit configured to determine, for each of the images of the respective colors, whether an image region including a target pixel whose pixel value is to be interpolated is a periodic region in which pixel values vary periodically;
a first pixel value generating unit configured to generate pixel values of the respective colors of a pixel using a first interpolation method;
a second pixel value generating unit configured to generate pixel values of the respective colors of a pixel using a second interpolation method different from the first interpolation method;
a control unit configured to determine, based on the determination result obtained by the periodicity determining unit, which one of the first and second pixel value generating units is to be used for generating pixel values of the respective colors of the target pixel; and
a pixel value combining unit configured to combine candidate pixel values which are the pixel values of the respective colors of the target pixel and which are generated by the first or second pixel value generating unit determined by the control unit to calculate a combined pixel value for interpolating the target pixel,
wherein the pixel value combining unit calculates a plurality of combined pixel values for the target pixel using a plurality of combination methods and determines whether the respective combined pixel values are suitable for interpolating the target pixel based on a degree of coincidence between a base pattern formed by an image region including the target pixel and at least one reference pattern that is set to a position in vicinity of the target pixel and has the same size as the base pattern.

2. The image processing apparatus according to claim 1, wherein the pixel value combining unit determines whether the candidate pixel value is suitable for combination based on the interpolation method that has been used for generating the candidate pixel value and performs the combination using only the candidate pixel value which is determined to be suitable for the combination.

3. The image processing apparatus according to claim 1, wherein the pixel value combining unit creates a plurality of sets of the candidate pixel values, combines the candidate pixel values included in the sets to calculate a plurality of combined pixel values, creates a plurality of base patterns using the plurality of combined pixel values, and selects a combined pixel value that results in a base pattern having the highest degree of coincidence with the at least one reference pattern among the plurality of base patterns.

4. The image processing apparatus according to claim 1, further comprising:
a boundary determining unit configured to set, as a reference region, at least one region in vicinity of the target pixel when the image region is determined to be the periodic region by the periodicity determining unit and to determine, based on image characteristics of the at least one reference region, whether the target pixel is present in the periodic region or the non-periodic region,
wherein the control unit determines, based on the determination results obtained by the periodicity determining unit and the boundary determining unit, which one of the first and second pixel value generating units is to be used for generating the candidate pixel values.

5. The image processing apparatus according to claim 1, further comprising:
a validity verification unit configured to verify validity of the generated candidate pixel value,
wherein the validity verification unit determines validity of the candidate pixel value based on related information obtained when the first pixel value generating unit generates the candidate pixel value, and when the validity verification unit determines that the candidate pixel value is invalid, the control unit causes the second pixel value generating unit instead of the first pixel value generating unit to generate the candidate pixel value.

6. The image processing apparatus according to claim 1, further comprising:
a validity verification unit configured to verify validity of the generated candidate pixel value; and
a third pixel value generating unit configured to generate a pixel value of the target pixel using a third interpolation method different from the first and second interpolation methods,
wherein the validity verification unit determines validity of the candidate pixel value based on related information obtained when the first pixel value generating unit generates the candidate pixel value, and when the validity verification unit determines that the candidate pixel value is invalid, the control unit causes the third pixel value generating unit instead of the first pixel value generating unit to generate the candidate pixel value.

7. The image processing apparatus according to claim 6, wherein the validity verification unit determines the validity of the candidate pixel value based on related information obtained when the third pixel value generating unit generates the candidate pixel value, and when the validity verification unit determines that the candidate pixel value is invalid, the control unit causes the second pixel value generating unit instead of the third pixel value generating unit to generate the candidate pixel value.

8. A pixel interpolation method performed in an image processing apparatus that includes a first pixel value generating unit to generate a pixel value of a pixel using a first interpolation method, and a second pixel value generating unit to generate a pixel value of a pixel using a second interpolation method different from the first interpolation method, the pixel interpolation method comprising:
separating a color image into a plurality of color components to generate images of respective colors;
determining, for each of the images of the respective colors, whether an image region including a target pixel whose pixel value is to be interpolated is a periodic region in which pixel values vary periodically;
determining, based on the determination result obtained in the determining of periodicity of the image region, which one of the first and second pixel value generating units is to be used for generating pixel values of the respective colors of the target pixel; and combining candidate pixel values which are the pixel values of the respective colors of the target pixel and which are generated by the first or second pixel value generating unit determined in the determining of the pixel value generating unit to calculate a combined pixel value for interpolating the target pixel,
wherein the combining includes calculating a plurality of combined pixel values for the target pixel using a plurality of combination methods and determining whether the respective combined pixel values are suitable for interpolating the target pixel based on a degree of coincidence between a base pattern formed by an image region including the target pixel and at least one reference pattern that is set to a position in vicinity of the target pixel and has the same size as the base pattern.

9. The pixel interpolation method according to claim 8,
wherein the combining includes determining whether the candidate pixel value is suitable for combination based on the interpolation method that has been used for generating the candidate pixel value and performing the combination using only the candidate pixel value which is determined to be suitable for the combination.

10. The pixel interpolation method according to claim 8,
wherein the combining of the candidate pixel values includes creating a plurality of sets of the candidate pixel values, combining the candidate pixel values included in the sets to calculate a plurality of combined pixel values, creating a plurality of base patterns using the plurality of combined pixel values, and selecting a combined pixel value that results in a base pattern having the highest degree of coincidence with the at least one reference pattern among the plurality of base patterns.

11. The pixel interpolation method according to claim 8, further comprising:
    determining validity of the candidate pixel value based on related information obtained when the first pixel value generating unit generates the candidate pixel value; and
    causing, when the candidate pixel value is determined to be invalid, the second pixel value generating unit instead of the first pixel value generating unit to generate the candidate pixel value.

12. The pixel interpolation method according to claim 8, further comprising:
    determining validity of the candidate pixel value based on related information obtained when the first pixel value generating unit generates the candidate pixel value; and
    causing, when the candidate pixel value is determined to be invalid, a third pixel value generating unit configured to generate the pixel value of the target pixel using a third interpolation method different from the first and second interpolation methods instead of the first pixel value generating unit to generate the candidate pixel value.

13. The pixel interpolation method according to claim 12, further comprising:
    determining the validity of the candidate pixel value based on related information obtained when the third pixel value generating unit generates the candidate pixel value; and
    causing, when the candidate pixel value is determined to be invalid, the second pixel value generating unit instead of the third pixel value generating unit to generate the candidate pixel value.

* * * * *